US012748652B2

(12) United States Patent
Zhu et al.

(10) Patent No.: US 12,748,652 B2
(45) Date of Patent: Sep. 29, 2026

(54) NETWORK ATTRIBUTE ANALYSIS

(71) Applicant: Telefonaktiebolaget LM Ericsson (publ), Stockholm (SE)

(72) Inventors: Zhongwen Zhu, Saint-Laurent (CA); Abdelwahab Hamou-Lhadj, Dollard-des-Ormeaux (CA); Salman Memon, Montreal (CA); Alka Isac, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/710,781

(22) PCT Filed: Nov. 17, 2021

(86) PCT No.: PCT/IB2021/060645

§ 371 (c)(1),
(2) Date: May 16, 2024

(87) PCT Pub. No.: WO2023/089356

PCT Pub. Date: May 25, 2023

(65) Prior Publication Data

US 2025/0021423 A1 Jan. 16, 2025

(51) Int. Cl.
*G06F 11/07* (2006.01)
*G06N 3/08* (2023.01)
(Continued)

(52) U.S. Cl.
CPC ........ *G06F 11/079* (2013.01); *G06F 11/0709* (2013.01); *G06N 3/08* (2013.01); *G06N 5/04* (2013.01); *G06N 20/00* (2019.01)

(58) Field of Classification Search
CPC ............... G06F 11/079; G06F 11/0709; G06F 11/0706; G06N 20/00; G06N 5/04; G05F 11/0766
See application file for complete search history.

(56) References Cited

U.S. PATENT DOCUMENTS 10,158,653 B1 * 12/2018 Magcale ................ G06F 21/55
11,025,502 B2 * 6/2021 Qaadri .................... H04L 41/16
(Continued)

FOREIGN PATENT DOCUMENTS

EP 3614313 A1 2/2020
WO 2020121084 A1 6/2020
(Continued)

OTHER PUBLICATIONS

International Search Report and Written Opinion dated Jul. 18, 2022 for International Application No. PCT/IB2021/060645 filed Nov. 17, 2021, consisting of 16 pages.
(Continued)

*Primary Examiner* — Jonathan D Gibson
(74) *Attorney, Agent, or Firm* — Weisberg I.P. Law, P.A.

(57) ABSTRACT

There is provided a computer-implemented method for analysing one or more network attributes of a network. One or more first network attributes of the network are analysed using a first machine learning model to generate a first output comprising information about an event in the network. If an estimated confidence level for the first output is less than a confidence level threshold, the one or more first network attributes are analysed using a second machine learning model to generate a second output. The second output is indicative of one or more second network attributes of the network to analyse using the first machine learning model.

19 Claims, 23 Drawing Sheets

(51) Int. Cl.
*G06N 5/04* (2023.01)
*G06N 20/00* (2019.01)

(56) References Cited

U.S. PATENT DOCUMENTS

| | | | | |
|---|---|---|---|---|
| 11,201,801 | B2 * | 12/2021 | Dinh | H04L 41/145 |
| 11,415,425 | B1 * | 8/2022 | Merchant | H04L 41/16 |
| 11,438,228 | B1 * | 9/2022 | Belton, Jr. | H04L 41/0803 |
| 11,442,803 | B2 * | 9/2022 | Cherbakov | G06F 11/0742 |
| 11,507,887 | B2 * | 11/2022 | Kolar | G06F 11/3006 |
| 11,658,407 | B2 * | 5/2023 | Tran | H01Q 1/44 343/721 |
| 11,698,878 | B1 * | 7/2023 | Douglis | G06F 13/385 710/313 |
| 11,838,172 | B2 * | 12/2023 | Cheng | H04L 41/142 |
| 12,008,403 | B2 * | 6/2024 | Banerjee | G06F 16/258 |
| 2021/0027205 | A1 * | 1/2021 | Sevakula | G06F 11/3447 |
| 2021/0156700 | A1 | 5/2021 | Davis et al. | |
| 2021/0165708 | A1 * | 6/2021 | Vijayaraghavan | G06N 3/04 |
| 2021/0287109 | A1 * | 9/2021 | Cmielowski | G06N 20/00 |
| 2021/0303378 | A1 * | 9/2021 | Sethi | G06F 18/2178 |
| 2022/0007199 | A1 * | 1/2022 | Mahalingam | H04W 48/16 |
| 2022/0329328 | A1 * | 10/2022 | Paulraj | H04B 17/11 |
| 2023/0069434 | A1 * | 3/2023 | Cheng | H04L 41/142 |
| 2024/0298193 | A1 * | 9/2024 | Nie | G06N 3/09 |
| 2025/0021423 | A1 * | 1/2025 | Zhu | G06F 11/0709 |

FOREIGN PATENT DOCUMENTS

| | | | |
|---|---|---|---|
| WO | 2020246973 | A1 | 12/2020 |
| WO | 2021121585 | A1 | 6/2021 |

OTHER PUBLICATIONS

N. Marzo; Natural Language Processing Model for Log Analysis to Retrieve Solutions for Troubleshooting Processes; Degree Project in Computer Science and Engineering; KTH Royal Institute of Technology; Jun. 16, 2021, consisting of 61 pages.
Architecture Working Group; View on 5G Architecture, 5G PPP; Version 3.0; Jun. 19, 2019, consisting of 166 pages.
J. Devlin et al.; BERT: Pre-training of Deep Bidirectional Transformers for Language Understanding; arXiv; May 24, 2019, consisting of 16 pages.
R. Nogueira et al.; Multi-Stage Document Ranking with BERT; arXiv; Oct. 31, 2019, consisting of 13 pages.

* cited by examiner

1600

Each Report/Ticket:

1. Heading {free text}
2. Description/Observation (free text}
3. AttachedLogs (List)
    1. Each file has ("file-name, file-type, and log-level)
        1. File-type:={system, access, trace, dump, KPI... etc.}
        2. Log-level:={INFO, DEBUG, ERROR,... }
4. AttachedPMCounters (List)
    1. PM counters are grouped under
        1. Accessibility (e.g. pmRadioRaCbAttMsg2)
        2. Integrity (Packet loss, Throughput, Latency, pmPdcpPktLossUlQos)
        3. Availability
        4. Computation (CPU usage)
        5. Memory (Storage usage)
        6. Network (Bandwidth usage, connectivity)
5. ImpactedModule (List)
    1. Each module has {"module-name, module-type, module-version}
        1. module-name:
        2. module-type: {NODE, VIRTUALIZATION,CONTAINER,SERVICE}
        3. module-version
6. Answer (free text)
    1. Machine-generated text for the resolution
    2. Human-generated text for the resolution

Figure 19

1800

Ticket/Report = "Heading[SP]Description[SP]AttachedLogs[SP]AttachedPMCounters[SP]ImpactedModule[SP]$Answer”

Heading={free text}
Description={free text}
AttachedLogs="F1-name[SP1]F1-type[SP1]F1-logLevel, F2-name[SP1]F2-type[SP1]F2-logLevel, ..."
AttachedPMCounters="Accessibility, Integrity, Availability, Computation, Memory, Network"
ImpactedModules="M1-name[SP1]M1-type[SP1]M1-version, M2-name[SP1]M2-type[SP1]M2-version, ..."
Answer={free text}

SP:= token A, it is used to separate different attributes under one ticket/report. e.g. SP=#
SP1:= token B, it is used to separate different elements under one attrbute, e.g. SP1=%

Figure 21

1900

Query="AttachedLogs[SP]AttachedPMCounters[SP]ImpactModuleType"

AttachedLogs="F1-name[SP1]F1-type[SP1]F1-logLevel, F2-name[SP1]F2-type[SP1]F2-logLevel, ..."
AttachedPMCounters="Accessibility, Integrity, Availability, Computation, Memory, Network"
ImpactedModuleType="M1-type, M2-type, ..."

SP:= token A, it is used to separate different attributes under one ticket/report. e.g. SP=#
SP1:= token B, it is used to separate different elements under one attribute, e.g. SP1=%

Figure 22

2000

Query="AttachedLogs[SP]AttachedPMCounters[SP]Failure-Type"

AttachedLogs="F1-name[SP1]F1-type[SP1]F1-logLevel, F2-name[SP1]F2-type[SP1]F2-logLevel, ..."
AttachedPMCounters="Accessibility, Integrity, Availability, Computation, Memory, Network"
Failure-Type={NODE, VIRTUALIZATION, CONTAINER, SERVICE}

SP:= token A, it is used to separate different attributes under one ticket/report. e.g. SP=#
SP1:= token B, it is used to separate different elements under one attribute, e.g. SP1=%

Figure 23

NETWORK ATTRIBUTE ANALYSIS

CROSS-REFERENCE TO RELATED APPLICATIONS

This application is a Submission Under 35 U.S.C. § 371 for U.S. National Stage Patent Application of International Application Number: PCT/IB2021/060645, filed Nov. 17, 2021 entitled "NETWORK ATTRIBUTE ANALYSIS," the entirety of which is incorporated herein by reference.

TECHNICAL FIELD

The disclosure relates to a computer-implemented method for analysing one or more network attributes, a computer-implemented method for training a machine learning model to analyse one or more network attributes, and a system configured to operate in accordance with those methods.

BACKGROUND

Many existing techniques for network analysis have limitations as they mostly require extensive manual input in order to be performed. For instance, when an event (e.g. a failure) occurs in a network, the event will typically be recorded and an alarm or notification may be sent to a user of the network (e.g. a network operator). In general, the user of the network responds by creating a report on the event which has occurred in the network, such that the report may be stored (e.g. in a database). At some time later, the report is typically picked up by another user of the network, such as a network engineer or a software designer. The other user evaluates the event and takes further action if necessary. For example, if the event is associated with a problem occurring in the network, the further action taken by the other user of the network will typically be an attempt to fix the problem that caused the event.

There is a heavy reliance on manual input in the existing techniques for network analysis and this can cause certain issues. For example, it can result in some procedures being repeated unnecessarily, which can in turn lead to users spending excessive time and effort performing network analysis, and it can also provide unreliable and/or inaccurate results.

Another issue associated with the existing techniques for network analysis is that the procedures that need to be carried out manually may be complicated. As a result, the existing techniques for network analysis can be inefficient. For example, it can be difficult to manually resolve a network event, e.g. due to the nature of the network event and thus a network user (e.g. network engineer and/or software designer) may spend hours or even days manually completing the network analysis necessary to understand (and potentially fix) the network event.

SUMMARY

It is an object of the disclosure to obviate or eliminate at least some of the above-described disadvantages associated with existing techniques.

Therefore, according to an aspect of the disclosure, there is provided a first computer-implemented method for analysing one or more network attributes of a network. The method comprises analysing one or more first network attributes of the network using a first machine learning model to generate a first output. The first output comprises information about an event in the network. The method also comprises, if an estimated confidence level for the first output is less than a confidence level threshold, analysing the one or more first network attributes using a second machine learning model to generate a second output. The second output is indicative of one or more second network attributes of the network to analyse using the first machine learning model.

According to another aspect of the disclosure, there is provided a second computer-implemented method for training a machine learning model to analyse one or more network attributes of a network. The second method comprises training a first machine learning model to analyse one or more first network attributes of the network to generate a first output. The first output comprises information about an event in the network. The second method also comprises training a second machine learning model to analyse the one or more first network attributes to generate a second output if an estimated confidence level for the first output is less than a confidence level threshold. The second output is indicative of one or more second network attributes of the network to analyse using the first machine learning model.

According to another aspect of the disclosure, there is provided a first entity configured to operate in accordance with the first method described earlier. In some embodiments, the first entity may comprise processing circuitry configured to operate in accordance with the first method described earlier. In some embodiments, the first entity may comprise at least one memory for storing instructions which, when executed by the processing circuitry, cause the first entity to operate in accordance with the first method described earlier.

According to another aspect of the disclosure, there is provided a second entity configured to operate in accordance with the second method described earlier. In some embodiments, the second entity may comprise processing circuitry configured to operate in accordance with the second method described earlier. In some embodiments, the second entity may comprise at least one memory for storing instructions which, when executed by the processing circuitry, cause the second entity to operate in accordance with the second method described earlier.

According to another aspect of the disclosure, there is provided a system comprising any one or more of the first entity described earlier and the second entity described earlier.

According to another aspect of the disclosure, there is provided a computer program comprising instructions which, when executed by processing circuitry, cause the processing circuitry to perform the first method described earlier and/or the second method described earlier.

According to another aspect of the disclosure, there is provided a computer program product, embodied on a non-transitory machine-readable medium, comprising instructions which are executable by processing circuitry to cause the processing circuitry to perform the first method described earlier and/or the second method described earlier.

Therefore, there is provided an advantageous technique for analysing network attributes of a network. There is also provided an advantageous technique for training a machine learning model to analyse the network attributes of the network. The manner in which the machine learning model is trained and used enables a more accurate analysis of network attributes. This allows more reliable information about an event in the network to be provided. The technique can be applied to reduce or even eliminate the requirement for certain network analysis procedures to be carried out manually, which can further improve the accuracy of the analysis and also reduces the burden on users of the network. The technique is also more efficient.

BRIEF DESCRIPTION OF THE DRAWINGS

For a better understanding of the techniques, and to show how they may be put into effect, reference will now be made, by way of example, to the accompanying drawings, in which:

FIG. 19 is an example of a report according to an embodiment;

FIG. 21 is an example of a report according to an embodiment;

FIGS. 22 and 23 are examples of a query according to some embodiments.

DETAILED DESCRIPTION

Some of the embodiments contemplated herein will now be described more fully with reference to the accompanying drawings. Other embodiments, however, are contained within the scope of the subject-matter disclosed herein, the disclosed subject-matter should not be construed as limited to only the embodiments set forth herein; rather, these embodiments are provided by way of example to convey the scope of the subject-matter to those skilled in the art.

As mentioned earlier, there is described herein an advantageous technique for analysing one or more network attributes of a network. This technique can be performed by a first entity. There is also described herein an advantageous technique for training a machine learning model to analyse one or more network attributes of a network. This technique can be performed by a second entity. The first entity and the second entity described herein may communicate with each other, e.g. over a communication channel, to implement the techniques described herein. In some embodiments, the first entity and the second entity may communicate over the cloud. The techniques described herein can be implemented in the cloud according to some embodiments. The techniques described herein are computer-implemented. The techniques described herein involve the use of artificial intelligence or machine learning (AI/ML).

The network referred to herein can be any type of network. For example, the network referred to herein can be a telecommunications network. In some embodiments, the network referred to herein can be a mobile network, such as a fourth generation (4G) mobile network, a fifth generation (5G) mobile network, a sixth generation (6G) mobile network, or any other generation mobile network. In some embodiments, the network referred to herein can be a radio access network (RAN). In some embodiments, the network referred to herein can be a local network, such as a local area network (LAN). In some embodiments, the network referred to herein may be a content delivery network (CDN). In some embodiments, the network referred to herein may be a software defined network (SDN). In some embodiments, the network referred to herein can be a fog computing environment or an edge computing environment. In some embodiments, the network referred to herein can be a virtual network or an at least partially virtual network.

Figure 1:
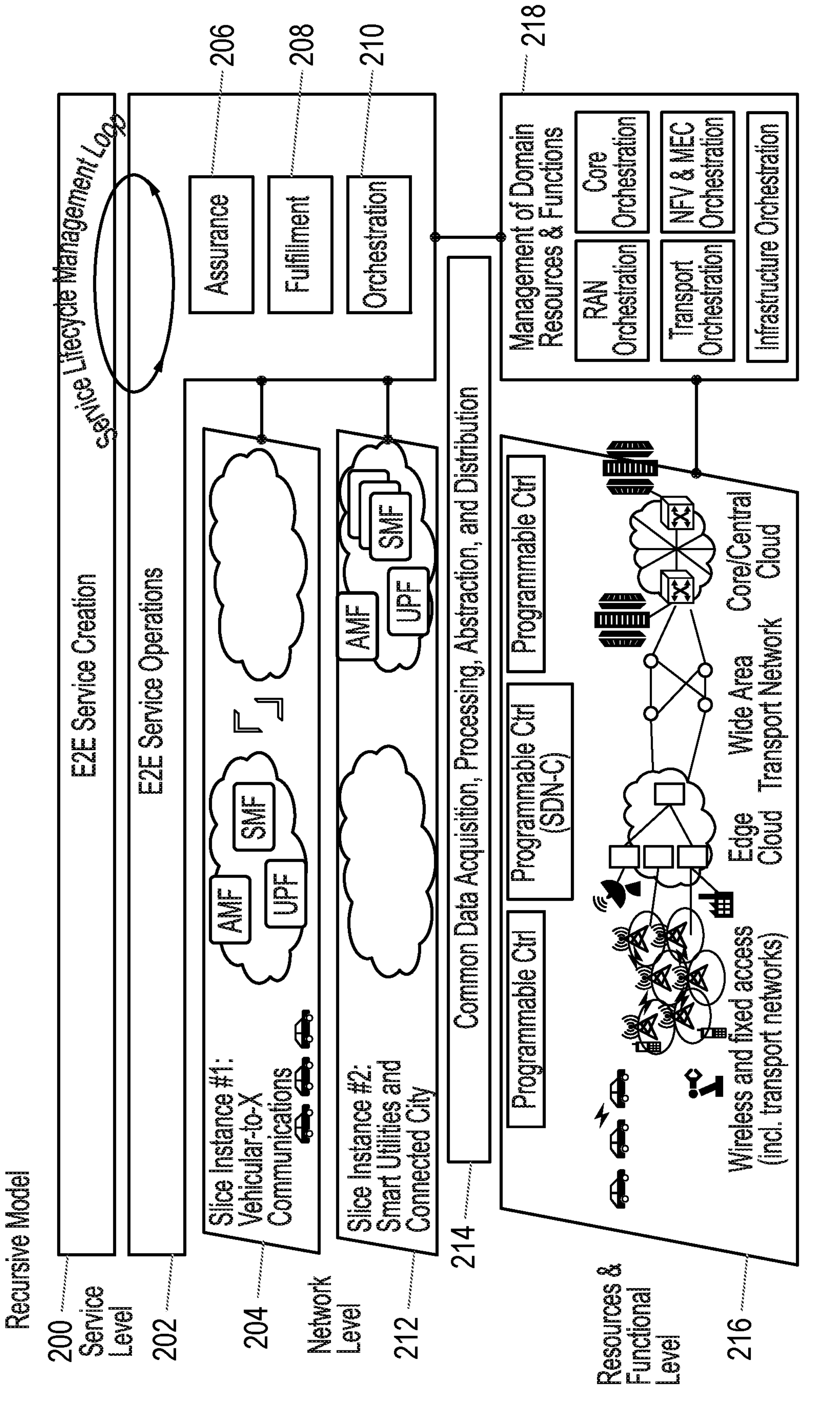
FIG. 1 is a schematic illustration of an example network architecture.

FIG. 1 illustrates an example architecture for the network. More specifically, FIG. 1 illustrates an overview of an example 5G network architecture. As illustrated in FIG. 1, the network comprises three levels, namely a service level 200, 202, a network level 204, 212, and a resource and functional level 216. The service level comprises end-to-end (E2E) service creation 200 and E2E service operation 202. As illustrated in FIG. 1, at the service level, the E2E service operation 202 provides a service lifecycle management. The service lifecycle management can, for example, include assurance 206, fulfilment 208, and orchestration 210. These activities can be realised through the resource and functional level 216.

The resource and functional level 216 comprises a physical infrastructure. The physical infrastructure comprises, for example, a wireless and fixed access network (e.g. including one or more transport networks), a mobile edge cloud (MEC) comprising at least one data center, a core network, etc. The core network can, for example, be a core (or central) cloud. The core network can communicate with the MEC (or, more specifically, at least one data center of the MEC) via a wide area network, such as a wide area transport network.

As illustrated in FIG. 1, the network level can comprise one or more network slices (or network slice instances) 204, 212. The one or more network slices are independent logical networks on the same physical infrastructure. For example, network virtualisation can be used to divide a single physical network connection into multiple distinct virtual connections, which can be referred to as network slices. Each network slice can provide resources to different traffic. For example, as illustrated in FIG. 1, a first network slice 204 may provide resources to vehicle-to-everything (V2X) communications and a second network slice 212 may provide resources to smart utilities and/or a connected city. Each network slice 204, 212 may comprise one or more network functions, such as at least one access and mobility management function (AMF), at least one session management function (SMF), at least one user plane function (UPF), and/or any other network function(s).

As illustrated in FIG. 1, there may be some common processes 214 performed at the network level and the resource and functional level, such as common data acquisition, data processing, data abstraction, and/or data distribution. At block 218 of FIG. 1, domain resources and functions are managed. The management of domain resources and functions can include the management of one or more orchestrations, such as any one or more of a 5G RAN orchestration, a 5G core orchestration, a transportation orchestration, a network functions virtualization (NFV) and MEC orchestration, and an infrastructure orchestration.

Figure 2:
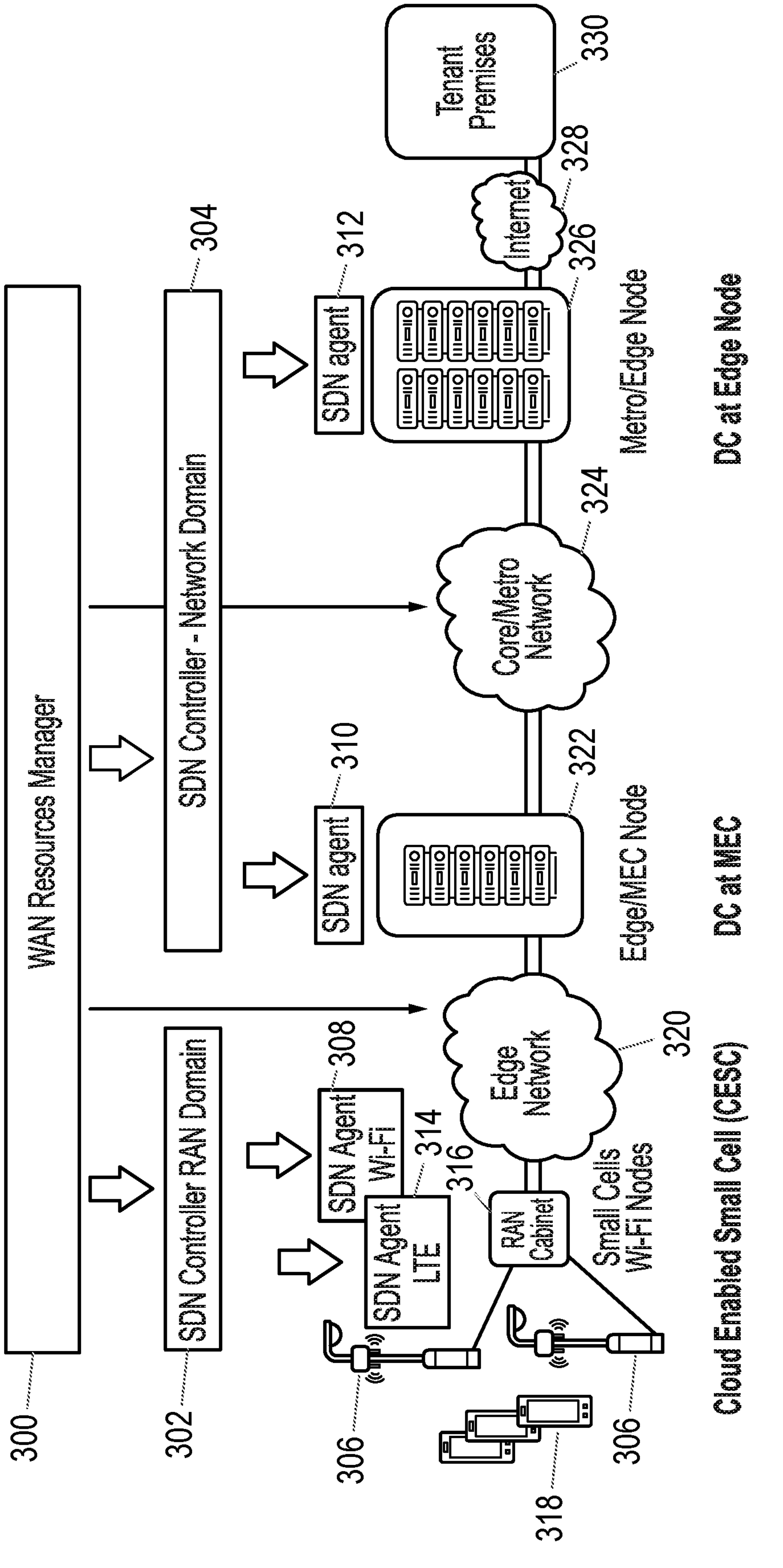
FIGS. 2 and 3 are schematic illustrations of a software defined network.

FIG. 2 illustrates an example SDN. More specifically, FIG. 2 illustrates an overview of an example SDN implementation in a 5G network. The SDN technology is used to manage the resources within the 5G network. As illustrated in FIG. 2, the SDN can comprise a resources manager 300, such as a wide area network (WAN) resources manager, one or more SDN controllers 302, 304, and one or more SDN agents 308, 310, 312, 314. The SDN agents 308, 310, 312, 314 can be deployed in different data centers where multiple physical resources are provided. One or more SDN agents 308, 314 may be deployed in the 5G RAN domain and/or one or more SDN agents 310, 312 may be deployed in the 5G core network domain. Different SDN controllers 302, 304 can be used to handle the 5G RAN and the 5G core network.

The 5G network can comprise one or more devices 306, 318, such as one or more wireless devices, e.g. one or more user equipments (UEs) 318 and/or one or more utility or smart city devices 306. The 5G network can also comprise a RAN 316, an edge network 320, an MEC node 322, a core (or metro) network 324, an edge node 326, an Internet connection 328, and some premises (e.g. tenant premises) 330. The RAN 316 can comprise one or more small cell Wi-Fi nodes. The small cells can be cloud enabled. Thus, a small cell can be referred to as a cloud enabled small cell (CESC). From an E2E point of view, the 5G network can comprise one or more data centers, such as one or more data centers at a cloud enabled small cell (CESC), one or more data centers at the MEC node 322, and/or one or more data centers at an edge node 326. At the CESC, a light version of a data center may be provided since it is located next to the base station. At the MEC and/or the edge node, a main data center may be deployed.

Figure 3:
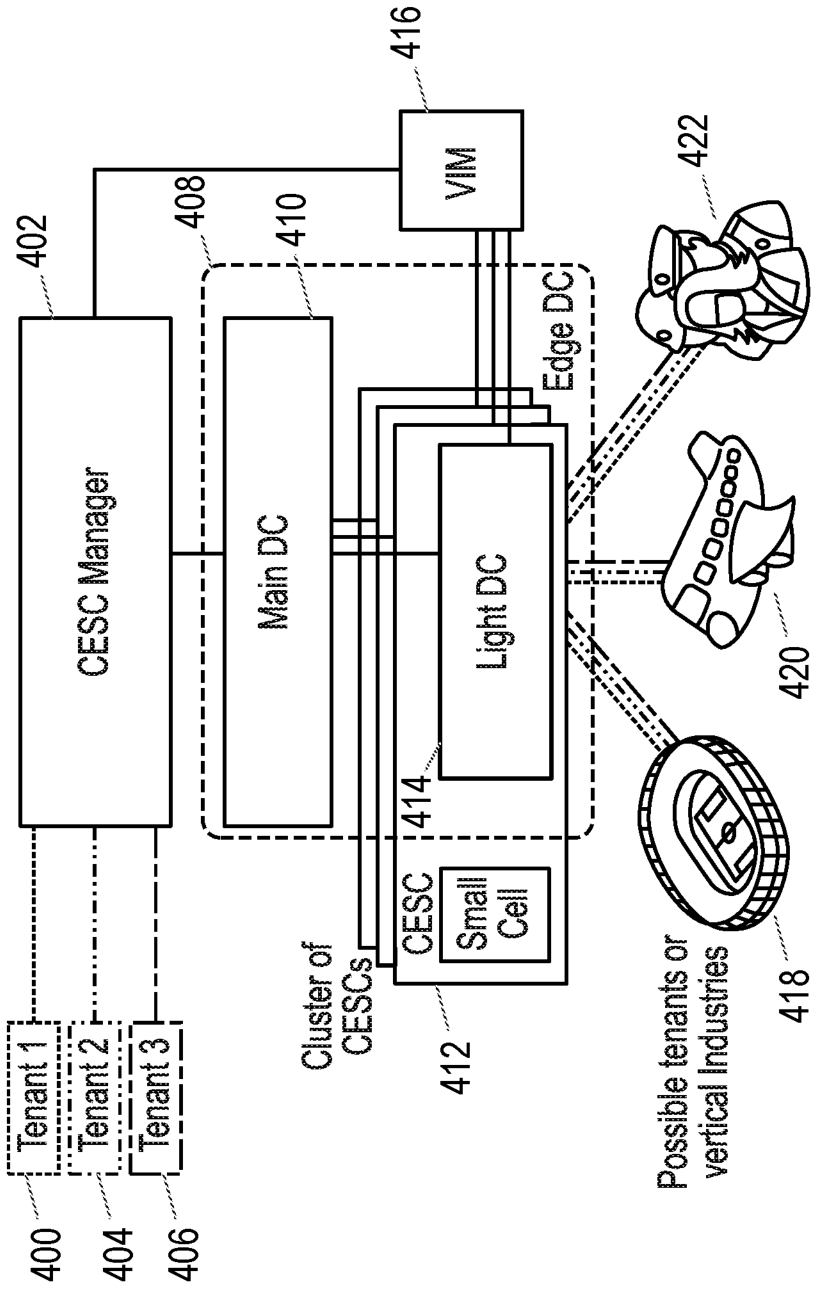

FIG. 3 illustrates an example SDN. More specifically, FIG. 3 illustrates a data center view of a CESC. As illustrated in FIG. 3, one or more users (e.g. tenants or service providers) 400, 404, 406 can communicate with the SDN via a CESC manager 402 and/or one or more possible users (e.g. tenants, service providers, or vertical industries) 418, 420, 422 can communicate with the SDN via a CESC 412. The SDN comprises the CESC 412 and the CESC manager 402. The CESC 412 may be part of a cluster of CESCs. The CESC 412 can comprise a light data center 414. The SDN can also comprise an edge data center 408. The edge data center 408 can comprise a main data center 410. The SDN can also comprise a virtualised infrastructure manager (VIM) 416.

The CESC manager 402 is responsible for managing the resources within the edge data center 408 through the VIM 416. The VIM 416 can control a network function virtualisation infrastructure (NFVI). The NFVI may include the computing, storage and networking resources of the edge data centres. The NFVI may create and control the CESC clusters. On top of the physical and virtual infrastructure, users 400, 404, 406, 418, 420, 422 may deploy their applications and/or provide services (e.g. to customers in the case of service providers).

Figure 4:
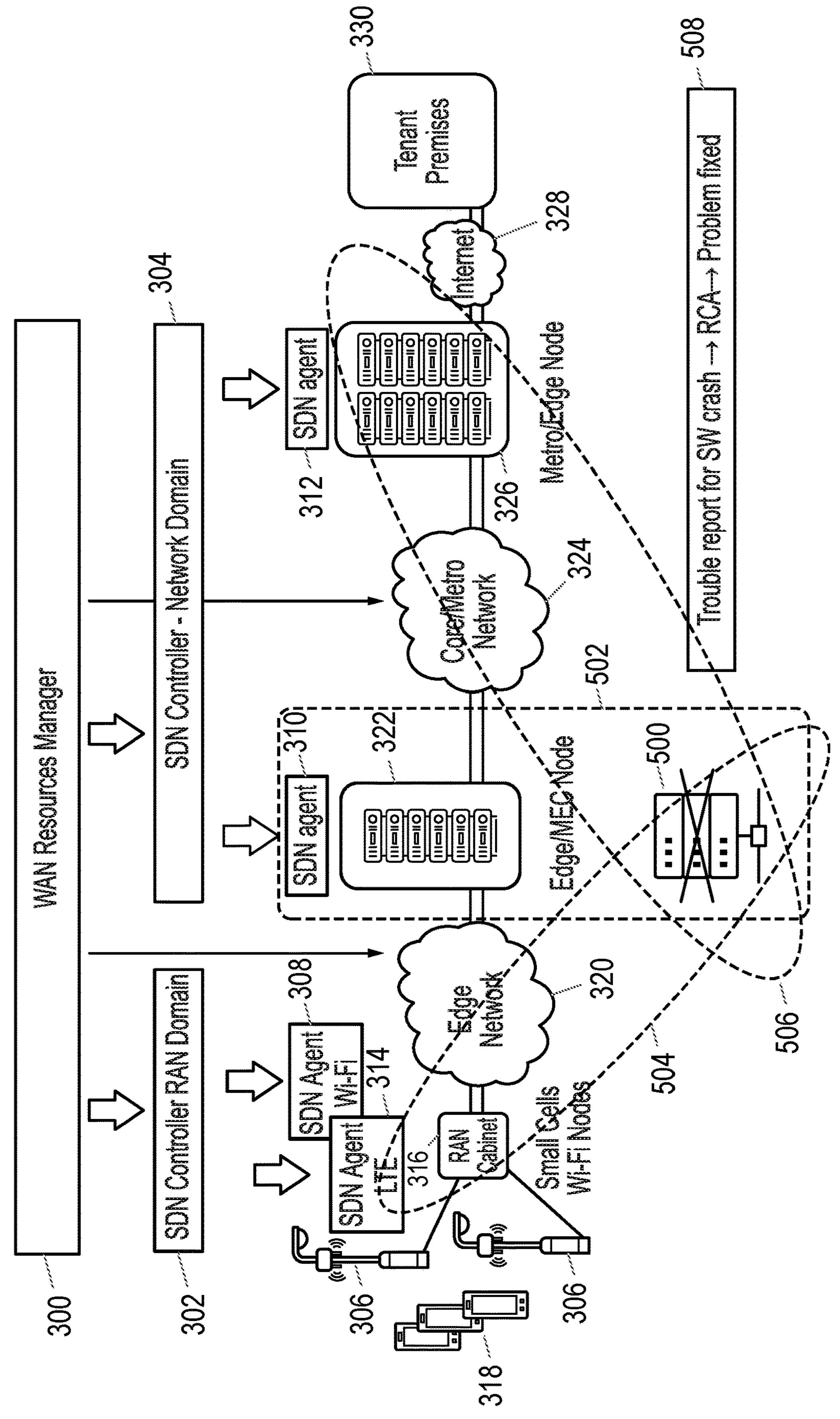
FIG. 4 is a schematic illustration of an event occurring in an example network.

FIG. 4 illustrates an event occurring in a network, namely the SDN of FIG. 2. More specifically, FIG. 4 illustrates examples of failures occurring in the 5G network (service, platform, and infrastructure) of FIG. 2. In the example illustrated in FIG. 4, a software (SW) failure 500 occurs in the MEC node 322. As illustrated in FIG. 4, the SW failure 500 may affect certain parts 502, 504, 506 of the SDN. The MEC node 322 may recover from the SW failure 500 by itself, e.g. depending on the design and/or severity of the SW failure 500. However, this may not always be the case.

In existing techniques, when the SW failure 500 occurs, the incident is recorded and an alarm or notification is sent to an operator. The operator then creates a trouble report (TR) 508 and stores the TR 508 in a database. Subsequently, a support engineer and/or a SW designer may retrieve the report, evaluate the issue and attempt to fix it. The techniques described herein can replace these manual processes to provide advantageous improvements.

Although some examples have been provided for the type of network referred to herein and the events that might occur in such a network, it will be understood that the network referred to herein can be any other type of network and the event referred to herein can be any other type of event.

In order to aid with understanding the techniques described herein and the associated technical advantages, an example of an existing technique will first be described.

Figure 5:
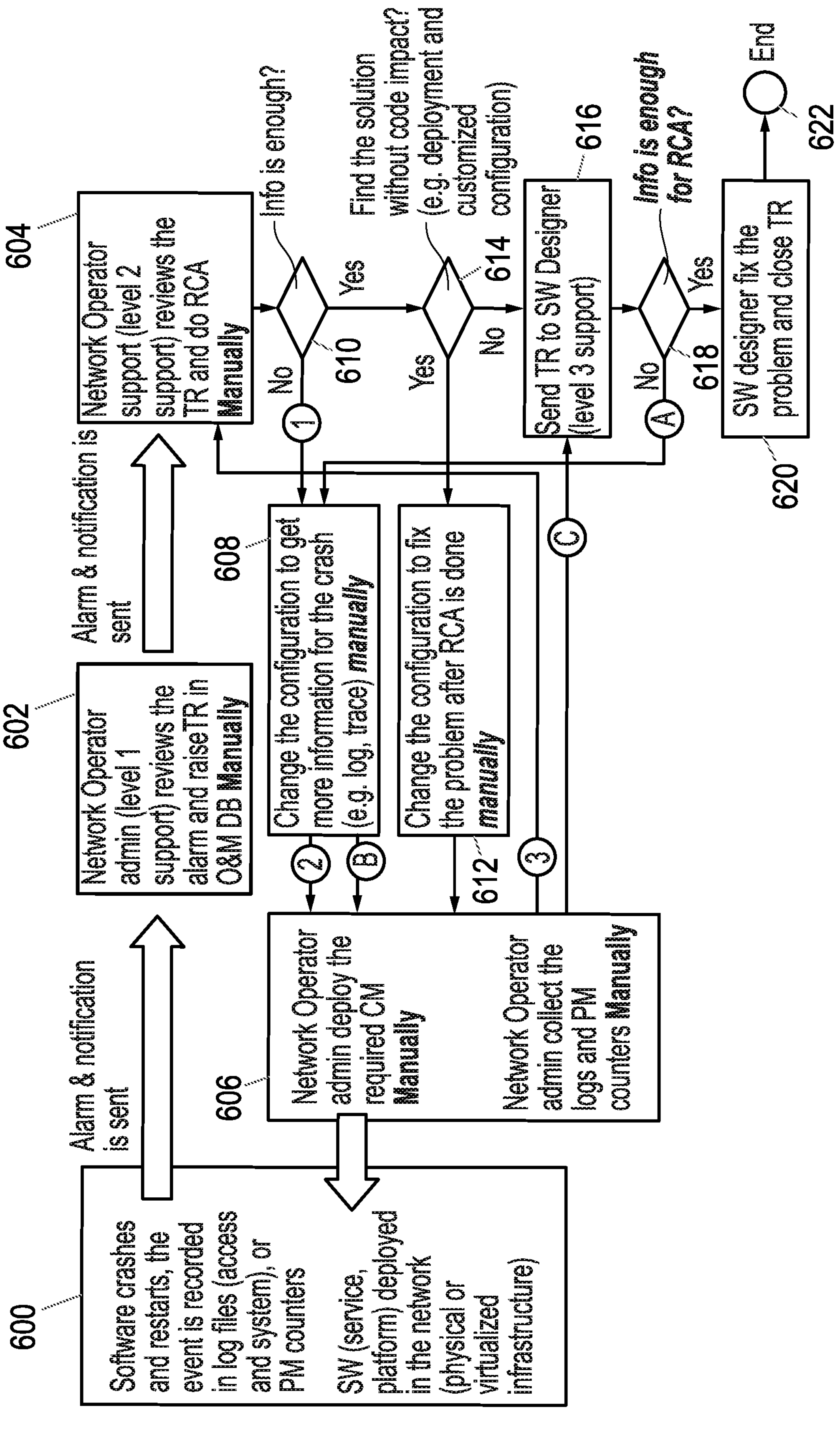
FIG. 5 is a flow chart illustrating a method for handling events occurring in a network.

FIG. 5 is a flow chart illustrating this existing technique, which is for handling events occurring in a network. More specifically, FIG. 5 is an example of a support flow for handling trouble reports (TRs). This is the normal trouble report flow for network operation and maintenance. A trouble report is a report on a problem in the network.

The support flow illustrated in FIG. 5 has three levels of support. The first level of support ("Level 1") is where a network operator administrator provides support. Specifically, at the first level of support, the network operator administrator reviews a report on a problem in the network and dispatches this report to a support engineer (e.g. a network operator or software product designer) who provides the second level of support ("Level 2") or the third level of support ("Level 3"). The second level of support is where the network operator provides support. Specifically, at the second level of support, the support engineer fixes the problem without involving software (SW) product designers. For instance, in an example where failed SW is responsible for the problem, the problem may be fixed through an adjustment to the configuration and deployment of the failed SW. If the support engineer cannot fix the issue, the support engineer will dispatch a report to the third level of support. The third level of support is where the SW product designer provides support. Specifically, at the third level of support, the SW product designer performs a root cause analysis (RCA) and fixes bugs in the product. For example, the SW product designer may release a SW update that fixes the problem. In a simplified operations and maintenance (O&M) support flow, the first level of support and the second level of support or the second level of support and the third level of support may be combined into a single level.

The three levels of support will now be described in more detail with reference to the example where failed SW is responsible for the problem. The SW failure may happen as illustrated in FIG. 4. When the SW failure occurs, as illustrated at block 600 of FIG. 5, an alarm and notification is sent to the network operator administrator. As illustrated at block 602 of FIG. 5, the network operator administrator reviews the SW failure and manually creates a trouble report (TR) based on collected information. The support engineer receives a notification about this TR and, as illustrated at block 604 of FIG. 5, manually performs an RCA. As illustrated at block 610 of FIG. 5, the support engineer may decide whether or not there is enough (i.e. a sufficient amount of) information in the TR to attempt to find a solution to the SW failure.

If the support engineer concludes that there is not enough information, as illustrated at block 608 of FIG. 5, the support engineer may ask the network operator administrator to re-configure (e.g. logging and tracing) settings in order to capture more detailed information about the SW failure, such as network traffic related to the SW failure. As illustrated by block 606 of FIG. 5, the network operator administrator deploys the required configuration management (CM) manually and collects the logs and performance management (PM) counters manually. The cycle illustrated as 1-2-3 in FIG. 5 may be repeated a plurality of times until the support engineer is satisfied that the detailed description of the SW failure is sufficient to help with finding a root cause of the SW failure. This procedure is also executed manually.

As illustrated at block 614 of FIG. 5, it may be checked whether the support engineer is able to determine a cause of the SW failure or provide a solution to it. For example, it may be checked whether a solution can be found without code impact. After performing an RCA and finding the root cause for the SW failure and the corresponding solution, the support engineer (at the second level of support) sends an instruction to fix the problem to the network operator administrator. As illustrated at block 612 of FIG. 5, for example, the support engineer may ask the network operator administrator to re-configure the SW in the network in order to fix the problem. The network operator administrator eventually redeploys or re-configures the SW in the network. At this point, the network operator administrator can close the TR.

On the other hand, as illustrated at block 616 of FIG. 5, if the support engineer is unable to determine the cause of the SW failure or provide a solution to it, the TR is sent/forwarded to the SW designer (at the third level of support). At this point, the SW designer may require more information from the network operation team. A similar procedure to that described in respect of the support engineer may be performed by the SW designer. The procedure follows steps A-B-C as indicated in FIG. 5. Again, the procedure is performed manually. As illustrated at block 618 of FIG. 5, it is determined whether there is enough (i.e. a sufficient amount of) information for the SW designer to perform an RCA. If there is not enough information for the SW designer to perform an RCA, then the process at block 608 is performed as described earlier. On the other hand, if there is enough information for the SW designer to perform an RCA, then the SW designer may be able to fix the SW failure after the required information is collected from the network as illustrated at block 620 of FIG. 5. The TR can then be closed and the process ends at 622.

In summary, in this three level support system for a network operations and management (O&M) model, there are two manual repeated procedures that are designed to obtain accurate information for a SW failure. Those two procedures may require a significant amount of time and effort. For example, if the problem is not obvious, then experienced engineers and/or designers may need to spend hours or even days to resolve the problem. It has proved to be challenging to shorten the time and effort spent collecting information relevant to a problem accurately and efficiently. However, the techniques described herein address the challenges associated with the existing techniques such as that illustrated in FIG. 5. Specifically, the techniques described herein address the challenges by introducing AI/ML based automation and optimisation into existing techniques, such as into the two repeated manual procedures in FIG. 5. The techniques described herein can significantly reduce the time and effort in resolving issues in a network.

Figure 6:
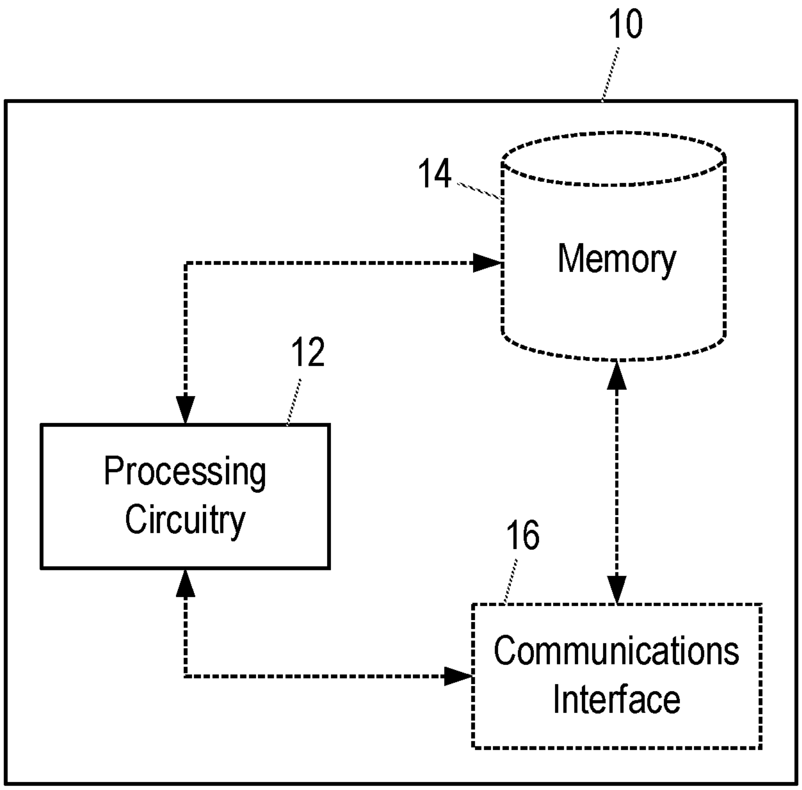
FIG. 6 is a block diagram illustrating a first entity according to an embodiment.

FIG. 6 illustrates a first entity 10 in accordance with an embodiment. The first entity 10 is for analysing one or more network attributes of a network. The first entity 10 referred to herein can refer to equipment capable, configured, arranged and/or operable to communicate directly or indirectly with the second entity referred to herein, and/or with other entities or equipment to enable and/or to perform the functionality described herein. The first entity 10 referred to herein may be a physical entity (e.g. a physical machine) or a virtual entity (e.g. a virtual machine, VM).

As illustrated in FIG. 6, the first entity 10 comprises processing circuitry (or logic) 12. The processing circuitry 12 controls the operation of the first entity 10 and can implement the method described herein in respect of the first entity 10. The processing circuitry 12 can be configured or programmed to control the first entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first entity 10. In some embodiments, the processing circuitry 12 can be configured to run software to perform the method described herein in respect of the first entity 10. The software may be containerised according to some embodiments. Thus, in some embodiments, the processing circuitry 12 may be configured to run a container to perform the method described herein in respect of the first entity 10.

Briefly, the processing circuitry 12 of the first entity 10 is configured to analyse the one or more first network attributes of the network using a first machine learning model to generate a first output comprising information about an event in the network. The processing circuitry 12 of the first entity 10 is also configured to, if an estimated confidence level for the first output is less than a confidence level threshold, analyse the one or more first network attributes using a second machine learning model to generate a second output. The second output is indicative of one or more second network attributes of the network to analyse using the first machine learning model.

As illustrated in FIG. 6, in some embodiments, the first entity 10 may optionally comprise a memory 14. The memory 14 of the first entity 10 can comprise a volatile memory or a non-volatile memory. In some embodiments, the memory 14 of the first entity 10 may comprise a non-transitory media. Examples of the memory 14 of the first entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first entity 10 can be connected to the memory 14 of the first entity 10. In some embodiments, the memory 14 of the first entity 10 may be for storing program code or instructions which, when executed by the processing circuitry 12 of the first entity 10, cause the first entity 10 to operate in the manner described herein in respect of the first entity 10. For example, in some embodiments, the memory 14 of the first entity 10 may be configured to store program code or instructions that can be executed by the processing circuitry 12 of the first entity 10 to cause the first entity 10 to operate in accordance with the method described herein in respect of the first entity 10.

Alternatively or in addition, the memory 14 of the first entity 10 can be configured to store any information, data, messages, requests, responses, indications, notifications, signals, or similar, that are described herein. The processing circuitry 12 of the first entity 10 may be configured to control the memory 14 of the first entity 10 to store information, data, messages, requests, responses, indications, notifications, signals, or similar, that are described herein.

In some embodiments, as illustrated in FIG. 6, the first entity 10 may optionally comprise a communications interface 16. The communications interface 16 of the first entity 10 can be connected to the processing circuitry 12 of the first entity 10 and/or the memory 14 of the first entity 10. The communications interface 16 of the first entity 10 may be operable to allow the processing circuitry 12 of the first entity 10 to communicate with the memory 14 of the first entity 10 and/or vice versa. Similarly, the communications interface 16 of the first entity 10 may be operable to allow the processing circuitry 12 of the first entity 10 to communicate with any one or more of the other entities (e.g. the second entity) referred to herein. The communications interface 16 of the first entity 10 can be configured to transmit and/or receive information, data, messages, requests, responses, indications, notifications, signals, or similar, that are described herein. In some embodiments, the processing circuitry 12 of the first entity 10 may be configured to control the communications interface 16 of the first entity 10 to transmit and/or receive information, data, messages, requests, responses, indications, notifications, signals, or similar, that are described herein.

Although the first entity 10 is illustrated in FIG. 6 as comprising a single memory 14, it will be appreciated that the first entity 10 may comprise at least one memory (i.e. a single memory or a plurality of memories) 14 that operate in the manner described herein. Similarly, although the first entity 10 is illustrated in FIG. 6 as comprising a single communications interface 16, it will be appreciated that the first entity 10 may comprise at least one communications interface (i.e. a single communications interface or a plurality of communications interface) 16 that operate in the manner described herein. It will also be appreciated that FIG. 6 only shows the components required to illustrate an embodiment of the first entity 10 and, in practical implementations, the first entity 10 may comprise additional or alternative components to those shown.

Figure 7:
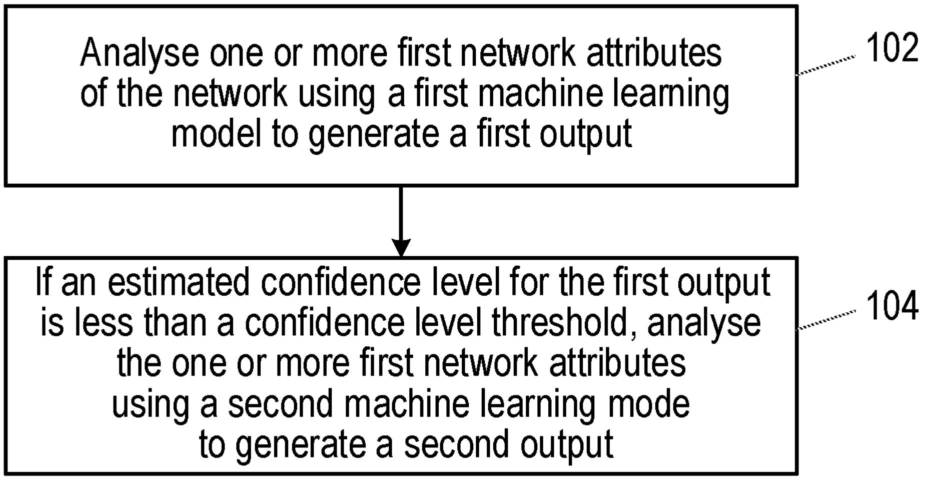
FIG. 7 is a flowchart illustrating a method performed by the first entity according to an embodiment.

FIG. 7 illustrates a first method performed by the first entity 10 in accordance with an embodiment. The first method is computer-implemented. The first method is for analysing one or more network attributes of a network. The first entity 10 described earlier with reference to FIG. 6 can be configured to operate in accordance with the first method of FIG. 7. The first method can be performed by or under the control of the processing circuitry 12 of the first entity 10 according to some embodiments.

With reference to FIG. 7, as illustrated at block 102, one or more first network attributes of the network are analysed using a first machine learning model to generate a first output. The first output comprises information about an event in the network. As illustrated at block 104 of FIG. 7, if an estimated confidence level for the first output is less than a confidence level threshold, the one or more first network attributes are analysed using a second machine learning model to generate a second output. The second output is indicative of one or more second network attributes of the network to analyse using the first machine learning model. The use of a machine learning model to generate an output can be referred to herein as inference.

The first machine learning model referred to herein may also be referred to as a classification model. The second machine learning model referred to herein may also be referred to as a recommendation model, such as a recommendation of extra network measurements model (RENMM) according to some embodiments. The first machine learning model referred to herein and/or the second machine learning model referred to herein can be any type of machine learning model. Examples of a machine learning model that can be used for the first machine learning model referred to herein and/or the second machine learning model referred to herein include, but are not limited to, a neural network (e.g. a deep neural network), a decision tree, or any other type of machine learning model. In some embodiments, the first machine learning model referred to herein and/or the second machine learning model referred to herein can be a supervised or semi-supervised machine learning model.

Although not illustrated in FIG. 7, in some embodiments, the first method may comprise repeating the first method (i.e. the steps described earlier with reference to FIG. 7) for one or more iterations, e.g. for one iteration, two iterations, three iterations, or any other number of iterations. For each iteration of the one or more iterations, if a second output is generated, the one or more second network attributes from the iteration can be analysed using the first machine learning model in the subsequent iteration. Thus, in some embodiments, the one or more second network attributes suggested by the second machine learning model are those that are analysed by the first machine learning model when the first method is repeated. In some embodiments, the first method can be repeated until the confidence level for the first output is equal to or greater than the confidence level threshold. The first entity 10 (e.g. the processing circuitry 12 of the first entity 10) can be configured to repeat the first method this way. By repeating the first method, the accuracy of the first method can be improved.

Although also not illustrated in FIG. 7, in some embodiments, the first method may comprise initiating a reconfiguration in the network for the one or more second network attributes to be acquired. The first entity 10 (e.g. the processing circuitry 12 of the first entity 10) can be configured to initiate the reconfiguration in the network. Herein, the term "initiate" can mean, for example, cause or establish. Thus, the first entity 10 (e.g. the processing circuitry 12 of the first entity 10) can be configured to itself reconfigure the network or can be configured to cause another entity to reconfigure the network.

In some embodiments, the first method may comprise, if the estimated confidence level for the first output is equal to or greater than the confidence level threshold, generating a report on the first output. Alternatively or in addition, in some embodiments, the first method may comprise, if the estimated confidence level for the first output is less than the confidence level threshold, generating a report on the second output. The first entity 10 (e.g. the processing circuitry 12 of the first entity 10) can be configured to generate the report on the first output and/or the report on the second output according to some embodiments.

In some embodiments, if a report on the first output is generated, the first method may comprise storing the report on the first output, initiating transmission of a notification indicating that the report on the first output has been generated, and/or initiating transmission of the report on the first output. Alternatively or in addition, in some embodiments, if a report on the second output is generated, the first method may comprise storing the report on the second output, initiating transmission of a notification indicating that the report on the second output has been generated, and/or initiating transmission of the report on the second output. The first entity 10 (e.g. the processing circuitry 12 of the first entity 10) can be configured to store the report on the first output and/or the report on the second output (e.g. in a memory 14 of the first entity 10) according to some embodiments. The first entity 10 (e.g. the processing circuitry 12 of the first entity 10) can be configured to initiate transmission of (e.g. itself transmit or cause another entity to transmit) the notification indicating that the report on the first output has been generated and/or the notification indicating that the report on the second output has been generated according to some embodiments. The first entity 10 (e.g. the processing circuitry 12 of the first entity 10) can be configured to initiate transmission of (e.g. itself transmit or cause another entity to transmit) the report on the first output and/or the report on the second output according to some embodiments.

In some embodiments, the report on the first output may comprise information indicative of the one or more first network attributes. In some embodiments, the one or more first network attributes and the first output may be analysed using the second machine learning model to generate the second output. The first entity 10 (e.g. the processing circuitry 12 of the first entity 10) can be configured to perform this analysis according to some embodiments.

Herein, the information about the event in the network may be any type of information about the event. In some embodiments, for example, the information about the event in the network may comprise any one or more of information indicative of a time of the event in the network, information indicative of a level within the network at which the event occurs, and information indicative of a cause of the event in the network. In embodiments where the information about the event in the network comprises information indicative of a level within the network at which the event occurs, the first machine learning model referred to herein may also be referred to as a network event level classification model (NELCM) or a network failure level classification model (NFLCM) where the event is a failure in the network. The first machine learning model can be trained to classify at which level within the network the event occurs. The levels within the network can be referred to herein as categories of the first machine learning model. The first machine learning model can be trained to classify the event according to one or more other categories in addition to, or alternatively to, the level within the network the event occurs.

Herein, in some embodiments, the level within the network can be any one or more of a level (namely, a node level) at which one or more network nodes are deployed in the network, a level (namely, a platform level) at which one or more computing platforms are deployed in the network, a level (namely, a virtualization or containerization level) at which virtualization or containerization occurs in the network, and a level (namely, a service level) at which one or more services are hosted or executed in the network. In some embodiments, the one or more services referred to herein may comprise one or more applications and/or one or more functions. Thus, in some embodiments, a four level classification can be provided. However, it will be understood that any other number of classifications levels can be used. For example, in some embodiments, additional classification levels may be defined depending on the evolution of network platform architecture.

In some embodiments, the information about the event in the network referred to herein may comprise, for one or more levels within the network, a percentage value indicative of a likelihood that the event in the network occurs at that level within the network. In some of these embodiments, the highest percentage value can be the information indicative of the level within the network at which the event occurs. In some embodiments, the first output generated by analysing the one or more first network attributes using the first machine learning model may be a probability distribution over a plurality of levels (e.g. any two or more of the node level, platform level, virtualization/containerization level, and service level) within the network. In some embodiments, the probability distribution can be expressed in percentage values, e.g. between 1% and 100%. Herein, a level may also be referred to as a class and, similarly, the plurality of levels can be referred to as a plurality of classes.

In some embodiments, the event in the network referred to herein may be a failure in the network, such as a software and/or hardware failure in the network.

In some embodiments, the confidence level threshold referred to herein can be configurable. In some embodiments, the confidence level threshold may be a percentage value. In some embodiments, the confidence level threshold may be at least 50%, at least 55%, at least 60%, at least 65%, at least 70%, at least 75%, at least 80%, at least 85%, at least 90%, or at least 95%. In some embodiments, for example, the confidence level threshold may be set to 50%, 55%, 60%, 65%, 70%, 75%, 80%, 85%, 90%, or 95%. The confidence level referred to herein can be defined as a level (e.g. a value, such as a percentage value) indicative of a confidence with which the first output is accurate or indicative of a probability that the first output is accurate. The confidence level threshold referred to herein can be defined as a threshold that a confidence level is to meet or exceed to be accepted as accurate. When a confidence level is below the confidence level threshold, it can be indicative that one or more second network attributes may be needed to improve the confidence level, e.g. to improve the probability for a certain class.

Although not illustrated in FIG. 7, in some embodiments, the first method may comprise estimating the confidence level for the first output. The first entity 10 (e.g. the processing circuitry 12 of the first entity 10) can be configured to perform the estimation of the confidence level for the first output according to some embodiments. In some embodiments, the confidence level threshold may be estimated by analysing the one or more first network attributes using a third machine learning model to generate a third output indicative of the estimated confidence level. Thus, in some embodiments, the confidence level threshold may be set by the third trained machine learning model, e.g. using a dataset collected from the network. The third machine learning model referred to herein can be any type of machine learning model. Examples of a machine learning model that can be used for the third machine learning model referred to herein include, but are not limited to, a neural network (e.g. a deep neural network), a decision tree, or any other type of machine learning model. In some embodiments, the third machine learning model referred to herein can be a supervised or semi-supervised machine learning model.

In some embodiments, all of the one or more second network attributes referred to herein may be different from the one or more first network attributes referred to herein. Alternatively, in other embodiments, the one or more second network attributes referred to herein may comprise at least one of the one or more first network attributes referred to herein and at least one other network attribute of the network. The one or more first network attributes referred to herein can comprise a single first network attribute or multiple first network attributes. Similarly, the one or more second network attributes referred to herein can comprise a single second network attribute or multiple second network attributes.

Although not illustrated in FIG. 7, in some embodiments, the first method may comprise acquiring the one or more first network attributes and/or acquiring the one or more second network attributes. The first entity 10 (e.g. the processing circuitry 12 of the first entity 10) can be configured to perform the acquisition of the one or more first network attributes and/or the one or more second network attributes according to some embodiments. In some embodiments, the one or more first network attributes referred to herein may comprise two or more first network attributes that are acquired from different locations in the network and/or the one or more second network attributes referred to herein may comprise two or more second network attributes that are acquired from different locations in the network. In some embodiments, the one or more first network attributes may be acquired from one or more network nodes of the network and/or the one or more second network attributes may be acquired from one or more network nodes of the network. In some embodiments, the one or more network nodes from which the one or more first network attributes are acquired may comprise one or more data centers and/or the one or more network nodes from which the one or more second network attributes are acquired may comprise one or more data centers.

In some embodiments, the one or more first network attributes may be acquired from any one or more of a log file, a trace file, any other file, a performance management (PM) counter, any other counter, and a memory (or database). Alternatively or in addition, in some embodiments, the one or more second network attributes may be acquired from any one or more of a log file, a trace file, any other file, a PM counter, any other counter, and a memory (or database). In embodiments where the one or more first network attributes are acquired from a file, each line in the file may comprise one or more first network attributes. Similarly, in embodiments where the one or more second network attributes are acquired from a file, each line in the file may comprise one or more second network attributes.

In some embodiments, the one or more first network attributes referred to herein may comprise one or more local network attributes and/or one or more global network attributes. Alternatively or in addition, in some embodiments, the one or more second network attributes referred to herein may comprise one or more local network attributes and/or one or more global network attributes. Herein, a local network attribute can be an attribute of (e.g. information about) a particular node of the network, such as the node from which this attribute is acquired. A local network attribute may only be available to the node from which it is acquired. That is, it may not be available (e.g. accessible) to other nodes in the network. Herein, a global network attribute can comprise an attribute of (e.g. information about) the network, such as one or more nodes in the network. A global network attribute may be available (e.g. accessible) to each of the one or more network nodes in the network, e.g. all network nodes in the network.

Herein, a network attribute can refer to any type of attribute (e.g. parameter, feature, or characteristic) of the network. A network attribute can provide information about the network, e.g. about the overall network or a node of the network. In some embodiments, the one or more first network attributes can comprise one or more network measurements, e.g. one or more network performance measurements. Alternatively or in addition, the one or more second network attributes can comprise one or more network measurements, e.g. one or more network performance measurements. In some embodiments, the one or more first network attributes and/or the one or more second network attributes may be in the form of a digital representation. In some embodiments, the one or more first network attributes and/or the one or more second network attributes can comprise one or more values from a counter (e.g. a PM counter) and/or text from a file (e.g. a log and/or trace file).

In some embodiments, the one or more first network attributes may comprise at least two first network attributes and the at least two first network attributes may be in a time series. Alternatively or in addition, in some embodiments, the one or more second network attributes may comprise at least two second network attributes and the at least two second network attributes may be in a time series. In some embodiments, the one or more first network attributes may comprise at least two first network attributes and each of the at least two first network attributes may have the same time stamp. Alternatively or in addition, in some embodiments, the one or more second network attributes may comprise at least two second network attributes and each of the at least two second network attributes may have the same time stamp.

In some embodiments, the one or more first network attributes may comprise a plurality of first network attributes organised in vector form and/or the one or more second network attributes may comprise a plurality of second network attributes organised in vector form. For example, in some embodiments, the one or more first network attributes may be encoded as a first vector and/or the one or more second network attributes may be encoded as a second vector. In embodiments where each line in a file comprises one or more first network attributes, each line in the file may be encoded as the vector or the one or more first network attributes that the line comprises may be encoded individually. Similarly, in embodiments where each line in a file comprises one or more second network attributes, each line in the file may be encoded as the vector or the one or more second network attributes that the line comprises may be encoded individually.

In some embodiments, the one or more first network attributes may comprise at least two first network attributes that are in different formats. In some of these embodiments, the first method may comprise converting the at least two first network attributes into the same format. In some embodiments, the one or more second network attributes may comprise at least two second network attributes that are in different formats. In some of these embodiments, the first method may comprise converting the at least two second network attributes into the same format. In some embodiments, at least one of the one or more first network attributes may not be in a machine-readable format. In some of these embodiments, the first method may comprise converting the at least one of the one or more first network attributes into a machine-readable format. In some embodiments, at least one of the one or more second network attributes may not be in a machine-readable format. In some of these embodiments, the first method may comprise converting the at least one of the one or more second network attributes into a machine-readable format. In some embodiments, the machine-readable format referred to herein may be a series of numerical digits. The first entity 10 (e.g. the processing circuitry 12 of the first entity 10) can be configured to perform any one or more of the conversions described herein according to some embodiments.

In some embodiments, analysing the one or more first network attributes using the second machine learning model to generate the second output may comprise using the second machine learning model to compare the one or more first network attributes to one or more second outputs previously generated using the second machine learning model and generate the second output based on a result of the comparison. Each previously generated second output may be indicative of one or more second network attributes of the network previously analysed using the first machine learning model.

Figure 8:
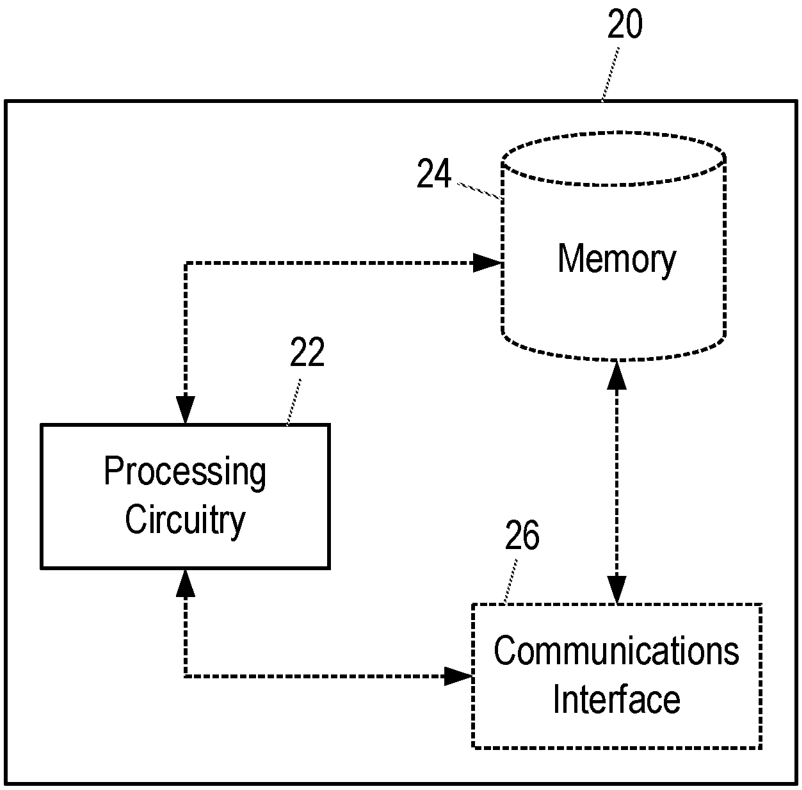
FIG. 8 is a block diagram illustrating a second entity according to an embodiment.

FIG. 8 illustrates a second entity 20 in accordance with an embodiment. The second entity 20 is for training a machine learning model to analyse one or more network attributes of a network. The second entity 20 referred to herein can refer to equipment capable, configured, arranged and/or operable to communicate directly or indirectly with the first entity 10 referred to herein, and/or with other entities or equipment to enable and/or to perform the functionality described herein. The second entity 20 referred to herein may be a physical entity (e.g. a physical machine) or a virtual entity (e.g. a virtual machine, VM).

As illustrated in FIG. 8, the second entity 20 comprises processing circuitry (or logic) 22. The processing circuitry 22 controls the operation of the second entity 20 and can implement the method described herein in respect of the second entity 20. The processing circuitry 22 can be configured or programmed to control the second entity 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the second entity 20. In some embodiments, the processing circuitry 22 can be configured to run software to perform the method described herein in respect of the second entity 20. The software may be containerised according to some embodiments. Thus, in some embodiments, the processing circuitry 22 may be configured to run a container to perform the method described herein in respect of the second entity 20.

Briefly, the processing circuitry 22 of the second entity 20 is configured to train a first machine learning model to analyse one or more first network attributes of the network to generate a first output. The first output comprises information about an event in the network. The second entity 20 is also configured to train a second machine learning model to analyse the one or more first network attributes to generate a second output if an estimated confidence level for the first output is less than a confidence level threshold. The second output is indicative of one or more second network attributes of the network to analyse using the first machine learning model.

As illustrated in FIG. 8, in some embodiments, the second entity 20 may optionally comprise a memory 24. The memory 24 of the second entity 20 can comprise a volatile memory or a non-volatile memory. In some embodiments, the memory 24 of the second entity 20 may comprise a non-transitory media. Examples of the memory 24 of the second entity 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the second entity 20 can be connected to the memory 24 of the second entity 20. In some embodiments, the memory 24 of the second entity 20 may be for storing program code or instructions which, when executed by the processing circuitry 22 of the second entity 20, cause the second entity 20 to operate in the manner described herein in respect of the second entity 20. For example, in some embodiments, the memory 24 of the second entity 20 may be configured to store program code or instructions that can be executed by the processing circuitry 22 of the second entity 20 to cause the second entity 20 to operate in accordance with the method described herein in respect of the second entity 20. Alternatively or in addition, the memory 24 of the second entity 20 can be configured to store any information, data, messages, requests, responses, indications, notifications, signals, or similar, that are described herein. The processing circuitry 22 of the second entity 20 may be configured to control the memory 24 of the second entity 20 to store information, data, messages, requests, responses, indications, notifications, signals, or similar, that are described herein.

In some embodiments, as illustrated in FIG. 8, the second entity 20 may optionally comprise a communications interface 26. The communications interface 26 of the second entity 20 can be connected to the processing circuitry 22 of the second entity 20 and/or the memory 24 of the second entity 20. The communications interface 26 of the second entity 20 may be operable to allow the processing circuitry 22 of the second entity 20 to communicate with the memory 24 of the second entity 20 and/or vice versa. Similarly, the communications interface 26 of the second entity 20 may be operable to allow the processing circuitry 22 of the second entity 20 to communicate with any one or more of the other entities (e.g. the first entity 10) referred to herein. The communications interface 26 of the second entity 20 can be configured to transmit and/or receive information, data, messages, requests, responses, indications, notifications, signals, or similar, that are described herein. In some embodiments, the processing circuitry 22 of the second entity 20 may be configured to control the communications interface 26 of the second entity 20 to transmit and/or receive information, data, messages, requests, responses, indications, notifications, signals, or similar, that are described herein.

Although the second entity 20 is illustrated in FIG. 8 as comprising a single memory 24, it will be appreciated that the second entity 20 may comprise at least one memory (i.e. a single memory or a plurality of memories) 24 that operate in the manner described herein. Similarly, although the second entity 20 is illustrated in FIG. 8 as comprising a single communications interface 26, it will be appreciated that the second entity 20 may comprise at least one communications interface (i.e. a single communications interface or a plurality of communications interface) 26 that operate in the manner described herein. It will also be appreciated that FIG. 8 only shows the components required to illustrate an embodiment of the second entity 20 and, in practical implementations, the second entity 20 may comprise additional or alternative components to those shown.

Figure 9:
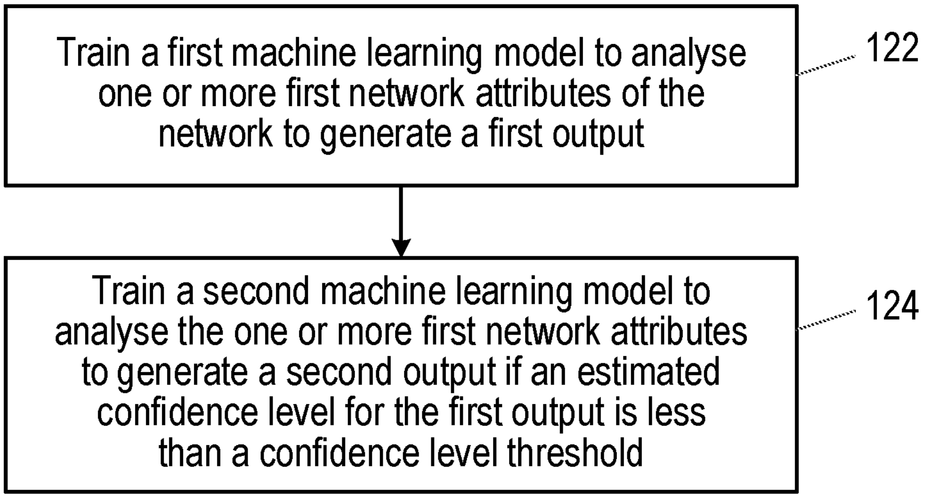
FIG. 9 is a flowchart illustrating a method performed by the second entity according to an embodiment.

FIG. 9 illustrates a second method performed by a second entity 20 in accordance with an embodiment. The second method is computer-implemented. The second method is for training a machine learning model to analyse one or more network attributes of a network. The second entity 20 described earlier with reference to FIG. 8 can be configured to operate in accordance with the second method of FIG. 9. The second method can be performed by or under the control of the processing circuitry 22 of the second entity 20 according to some embodiments.

With reference to FIG. 9, as illustrated at block 122, a first machine learning model is trained to analyse one or more first network attributes of the network to generate a first output. The first output comprises information about an event in the network. As illustrated at block 124 of FIG. 9, a second machine model is trained to analyse the one or more first network attributes to generate a second output if an estimated confidence level for the first output is less than a confidence level threshold. The second output is indicative of one or more second network attributes of the network to analyse using the first machine learning model.

In some embodiments, the first machine learning model may be trained using a first training dataset. The first training dataset may comprise information indicative of a past occurrence of the event in the network and one or more first network attributes of the network corresponding to the past occurrence of the event. In some embodiments, the information indicative of a past occurrence of the event in the network may be acquired from a memory (or database), e.g. comprising a repository of trouble reports and/or trouble report tickets. In some embodiments, the one or more first network attributes may be acquired from any one or more of a log file, a trace file, any other file, a PM counter, any other counter, and a memory (or database). The information indicative of the past occurrence of the event in the network and the one or more first network attributes of the network corresponding to the past occurrence of the event may be labelled.

In some embodiments, the second machine learning model may be trained using a second training dataset. The second training dataset may comprise the one or more first network attributes of the network corresponding to the past occurrence of the event and one or more second network attributes of the network corresponding to the past occurrence of the event. In some embodiments, the one or more first network attributes and/or the one or more second network attributes may be acquired from any one or more of a log file, a trace file, any other file, a PM counter, any other counter, and a memory (or database). The one or more first network attributes and/or the one or more second network attributes may be labelled.

The labelling can be used to train the first and second machine learning models, such as using a supervised or semi-supervised machine learning process, e.g. an auto-encoding process or a bidirectional encoder representations (BERT) process.

In some embodiments, the dataset used to train any of the machine learning models referred to herein may be a time-series dataset. The dataset can itself comprise different types of datasets according to some embodiments. For example, a dataset may comprise one or more log files, one or more trace files, one or more PM counters, and/or any other type of dataset. For datasets (e.g. log and trace files) comprising text, text feature processing may be implemented, such as in the manner described later with reference to FIG. 17. For datasets (e.g. PM counters) comprising numbers, numerical time series feature processing may be implemented, such as in the manner described later with reference to FIG. 16. As some types of dataset (e.g. PM counters) may have different report output periods (ROPs) from that for other types of dataset (e.g. log and trace files), the different types of dataset may be synchronized with each other.

With regard to labelling a dataset, in some embodiments, a label can be assigned to each interval in time in order for the machine learning model to learn the label from the one or more respective network attributes during the same time interval. In some embodiments, the labels may include categories such as keywords (e.g. "node failure"), alarms, post-mortem dumps, or any other information included in the dataset that can aid in understanding the event (e.g. failure/error) in the network. This approach may include the use of domain expertise to categorise events into the selected categories. An example is as follows:

Snapshot of llogs: Extra: BB Restart: Emca 2:DSP 27: "LDM Alloc error: Out of memory\nalloc at: strid: 12c, size: 0xffffb9a2".

Alternatively or in addition, the criteria to label a dataset can be based on information retrieved about a corresponding report (e.g. a TR) stored in a memory (e.g. database), such as the reason for closing the report. The report may comprise information on how the same event was handled in the past. The closed report can then itself be used as a labelled dataset to train the machine learning model. Thus, a training dataset and the labelling of the training dataset can be based on previous experience (i.e. experience gained in the past), e.g. with or without human intervention. For reports having corresponding closing codes, the labels may be fixed as the closing codes. As more than 50% of reports have data center graphics processor usage manager (DCGM) logs attached to them, a time duration of these logs can be acquired from the attached DCGM logs. Once the time duration is acquired, the corresponding PM counters and report closing code can be acquired.

In some embodiments, a semi-supervised clustering approach may be used for labelling, whereby a plurality of network attributes are grouped into a plurality of clusters. A combination of expert input and report closure codes can be used to label a subset of time stamps belonging to different clusters using the network attributes.

When applying a trained machine learning model, the same process used for training may be followed for cleaning the input dataset. However, the input dataset in the case of applying the trained machine learning model need not be labelled.

In some embodiments, the information indicative of the past occurrence of the event referred to herein can have a time stamp indicative of a time of the past occurrence of the event and/or each first network attribute of the one or more first network attributes can have a time stamp indicative of a time at which the first network attribute was recorded. In some of these embodiments, for each first network attribute of the one or more first network attributes, the time at which the first network attribute was recorded may be a time that falls within a predefined time interval that precedes the time of the past occurrence of the event.

Although not illustrated in FIG. 9, in some embodiments, the second method may comprise, prior to training the first machine learning model using the first training dataset, performing a dimension reduction on the first training dataset. The second entity 20 (e.g. the processing circuitry 22 of the second entity 20) can be configured to perform the dimension reduction according to some embodiments. In some embodiments, the one or more first network attributes may comprise a plurality of first network attributes. In some of these embodiments, the second method may comprise, prior to training the first machine learning model using the first training dataset, grouping the plurality of first network attributes into a plurality of clusters (or groups). In some of these embodiments, the second method may also comprise assigning a label to each cluster of the plurality of clusters. The second entity 20 (e.g. the processing circuitry 22 of the second entity 20) can be configured to perform the grouping and/or assigning in the described manner. The plurality of first network attributes can be grouped using any suitable clustering process of which a person skilled in the art will be aware. In some embodiments, the plurality of first network attributes can be grouped using a semi-supervised clustering process.

Thus, in the manner described herein, a first machine learning model is built and trained. The first machine learning model can be trained using one or more datasets (or data sources), such as one or more logs, one or more traces, one or more PM counters, and/or any other dataset(s). The trained first machine learning model can learn a mechanism for analysing one or more network attributes of the network (e.g. correlated from different datasets) to identify information about an event in the network.

According to some embodiments, the information about the event can be a level in the network at which the event occurs. In some of these embodiments, it may be determined whether a probability for classifying the event to one or more of those defined levels is high enough based on the given criterion of the confidence level threshold mentioned earlier. The criterion can be configurable and/or set by another machine learning model, such as based on the accumulated dataset from the network. If the probability for classifying the event to one or more of those defined levels is not high enough, the configuration settings for the (e.g. logging and/or tracing) mechanism used to captured information from the network may be updated to capture additional and/or alternative information from the network in the future. This feedback procedure may be repeated (e.g. automatically, such as with minimum human intervention or without human intervention) until the given criterion is satisfied.

The techniques described herein can be applied to any one or more of the manual processes of the existing techniques described earlier. In some embodiments, an event that comprises a service failure may be treated differently from an event comprising any other (e.g. node, platform, or virtualization/containerization) failure. The technique described herein can use information from different locations in the network instead of a single data center. This can be particularly beneficial where service instances appear and disappear in certain locations, such as due to the service demands from end users.

There is also provided a system comprising the first entity 10 described herein and the second entity 20 described herein. A computer-implemented method performed by the system comprises the method described herein in respect of the first entity 10 and the method described herein in respect of the second entity 20.

Figure 10:
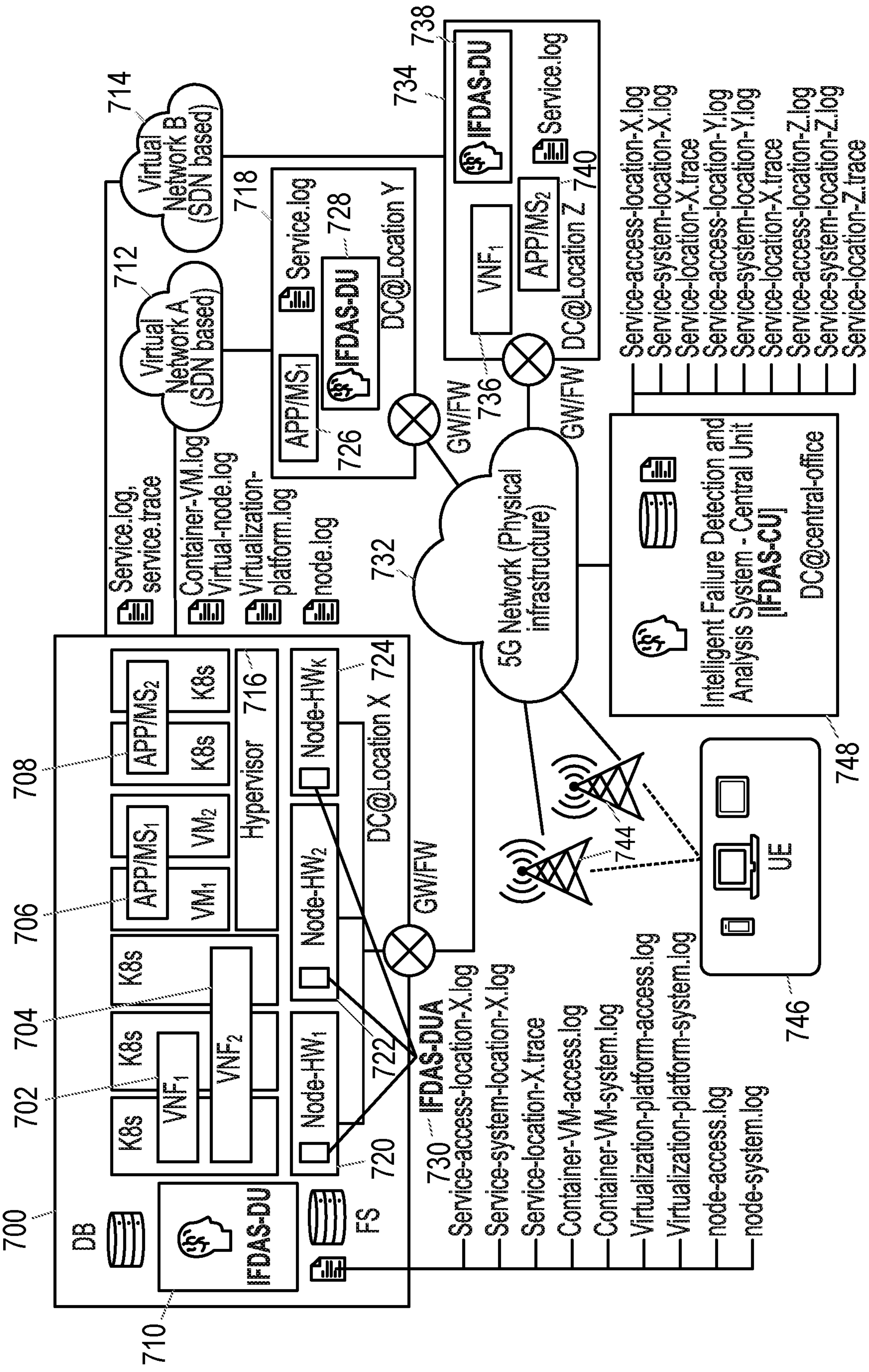
FIG. 10 is a schematic illustration of a system according to some embodiments.

FIG. 10 is an example of such a system or, more specifically, the architecture of such a system. In the example illustrated in FIG. 10, the system comprises one or more data centers 700, 718, 734, 748 (DCs) and a network. In the example illustrated in FIG. 10, the network is a 5G mobile network. As illustrated in FIG. 10, the network comprises some physical infrastructure 732, one or more network nodes (e.g. one or more base stations, such as one or more radio base stations) 744 and one or more user equipments (UEs) 746. The one or more UEs 746 can communicate with the physical infrastructure 732 of the network via the one or more network nodes 744. The one or more DCs 700, 718, 734, 748 are communicatively coupled to the physical infrastructure 732 of the network.

In the example illustrated in FIG. 10, the system comprises two network nodes 744, three UEs 746, and four DCs 700, 718, 734, 748. However, it will be understood that the system may comprise any other number of network nodes, any other number of UEs, and/or any other number of DCs according to other examples. In the example illustrated in FIG. 10, a first DC 700 and a second DC 718 can communicate via a first virtual network ("Virtual Network A") 712, and the first DC 700 and a third DC 734 can communicate via a second virtual network ("Virtual Network B") 714. In some embodiments, any one or both of the first virtual network 712 and the second virtual network 714 can be a software defined network (SDN).

As illustrated in FIG. 10, each of the DCs 700, 718, 734, 748 may be located at different locations in the network. For example, the first DC 700 may be located at "Location X", the second DC 718 may be located at "Location Y", the third DC 734 may be located at "Location Z", and a fourth DC 748 may be located at a central location, such as a "central-office". However, it will be understood that, in alternative embodiments, any one or more (e.g. each) of the DCs 700, 718, 734, 748 may be located at the same location in the network. Any one or more of the first, second, and third DCs 700, 718, 734 may be located at an edge node or a CESC. The fourth DC 748 may be at an edge node or an MEC. The location of the fourth DC 748 may, for example, depend on the size of the network to be covered.

A processing unit (or processing circuitry) can be deployed for each DC to be managed. In the example illustrated in FIG. 10, a processing unit 710, 728, 738 is deployed at each of the DCs 700, 718, 734, 748. More specifically, a distributed unit (DU) 710, 728, 738 is deployed at each of the first, second, and third DCs 700, 718, 734, and a central unit (CU) is deployed at the fourth DC 748. The system can also comprise one or more other processing units (or processing circuitry) 730, which are each referred to as a distributed unit agent (DUA). For example, in the example illustrated in FIG. 10, the first DC 700 comprises one or more nodes (e.g. hardware nodes) 720, 722, 724 and each of these nodes 720, 722, 724 of the first DC 700 may comprise a DUA 730.

In the example illustrated in FIG. 10, the first DC 700 also comprises one or more virtual network functions (VNFs) 702, 704, one or more applications or services 706, 708, and a hypervisor 716. The one or more virtual network functions (VNFs) 702, 704 can run on an orchestration system, such as a Kubernetes (K8s) system. The one or more applications or services 706, 708 can each run on such a system or a VM. In the example illustrated in FIG. 10, the second DC 718 comprises one or more applications or services 726 and the third DC 734 comprises one or more VNFs 736 and one or more applications or services 740. Although some examples have been provided for some of the components of the DCs 700, 718, 734, it will be appreciated that FIG. 10 only shows the components required to illustrate an example of the DCs 700, 718, 734 and, in practical implementations, the DCs 700, 718, 734 may comprise additional or alternative components to those shown.

In the example illustrated in FIG. 10, the technique described herein may be used in the detection of an event in the network, such as a failure (e.g. a SW failure) in the network. Thus, the system may be referred to as an intelligent failure detection and analysis system (IFDAS). However, it will be understood that this is only one of many examples of use cases to which the technique described herein can be applied and the technique can be applied in relation to any event in the network.

As described earlier, one or more first network attributes of the network are analysed using a first machine learning model to generate a first output comprising information about an event in the network and, if an estimated confidence level for the first output is less than a confidence level threshold, the one or more first network attributes are analysed using a second machine learning model to generate a second output. This second output is indicative of one or more second network attributes of the network to analyse using the first machine learning model.

As also described earlier, the information about an event in the network may be any type of information about the event in the network but, in some embodiments, can comprise information indicative of a level within the network at which the event occurs. In this respect, a four level classification is used in the example illustrated in FIG. 10. Specifically, the event can be classified as being at a node level, a platform level, a virtualization or containerization (e.g. VM) level, or a service (e.g. application or function) level.

As described earlier, the one or more first network attributes that are analysed may comprise one or more local network attributes and/or one or more global network attributes. For a service level event, it can be beneficial for one or more local attributes (e.g. from logs, traces, etc.) and one or more global (e.g. meta) attributes (e.g. location, etc.) to be taken into account in the analysis. For a node level event, platform level event, and virtualization or containerization level event, it can be beneficial for only one or more local attributes (e.g. from logs, traces, etc.) to be taken into account in the analysis. This may be particularly beneficial when the event is considered to only be a local event. For more sophisticated network platform deployment (e.g. a platform that manages heterogenous resources deployed across different geographic locations), other attributes may be taken into account in the analysis, such as its location and/or any other attributes.

The one or more first attributes can be acquired from one or more (e.g. a plurality of different) locations, such as from any one or more of the different DCs 700, 718, 734, 748. The one or more first attributes can be consolidated in the CU at the fourth DC 748. Thus, the CU at the fourth DC 748 may collect all first attributes from different DUs 710, 728, 738 deployed in the first, second, and third DCs 700, 718, 734 located across different geographic regions. The CU at the fourth DC 748 can, for example, retrieve the one or more first attributes from access logs, system logs, and/or traces, which may be for a specific service from all of the involved DCs 700, 718, 734 (e.g. based on a deployment footprint, which may be changed dynamically according to the demands from end users/devices, such as the UEs 746).

The CU at the fourth DC 748 can be configured to apply the first trained machine learning model described herein and, if required, the second machine learning model described herein, e.g. to identify which one or more features in an offered service led to the event in the network. As described earlier, the second machine learning model can be trained using a training dataset of past events to identify (e.g. a list of) one or more additional and/or alternative second network attributes needed to diagnose the incoming or current event. If the CU at the fourth DC 748 needs one or more additional and/or alternative second network attributes (e.g. more detailed log and/or trace information), the CU at the fourth DC 748 can be configured to update one or more (e.g. CM) parameters for this. This update may be according to a rule or policy given by a service provider.

The CU at the fourth DC 748 may send the one or more updated parameters to one or more of the DUs 710, 728, 738 of the DCs 700, 718, 734 to reconfigure the attribute acquisition (e.g. logging and tracing). For example, the attribute acquisition may be reconfigured to acquire more detailed service traffic in any one or more of the first, second, and third DCs 700, 718, 734. At any one or more of the first, second, and third DCs 700, 718, 734, the corresponding DU 710, 728, 738 may send the one or more updated parameters (e.g. for logging and tracing) to at least one DUA 730 that is deployed at node level to configure the corresponding components, e.g. the components that start to log or trace more detailed information for the event occurring in the network.

In FIG. 10, some of the method steps are illustrated as being performed by one or more DUs 710, 728, 738, a CU 748, and a DUA 730. It will be understood that the first entity 10 (or, more specifically, the processing circuitry 12 of the first entity 10) described earlier with reference to FIG. 6 may comprise any one or more of these units 700, 728, 738, 748, 730 and thus the method performed by any one or more of these units 700, 728, 738, 748, 730 can equally be said to be performed by the first entity 10 (or, more specifically, the processing circuitry 12 of the first entity 10). In embodiments where the first entity 10 (or, more specifically, the processing circuitry 12 of the first entity 10) comprises more than one of the units 700, 728, 738, 748, 730, the first entity can be an entity that is distributed across multiple nodes, e.g. any two or more of the DCs 700, 718, 734, 748 illustrated in FIG. 10.

Figure 11:
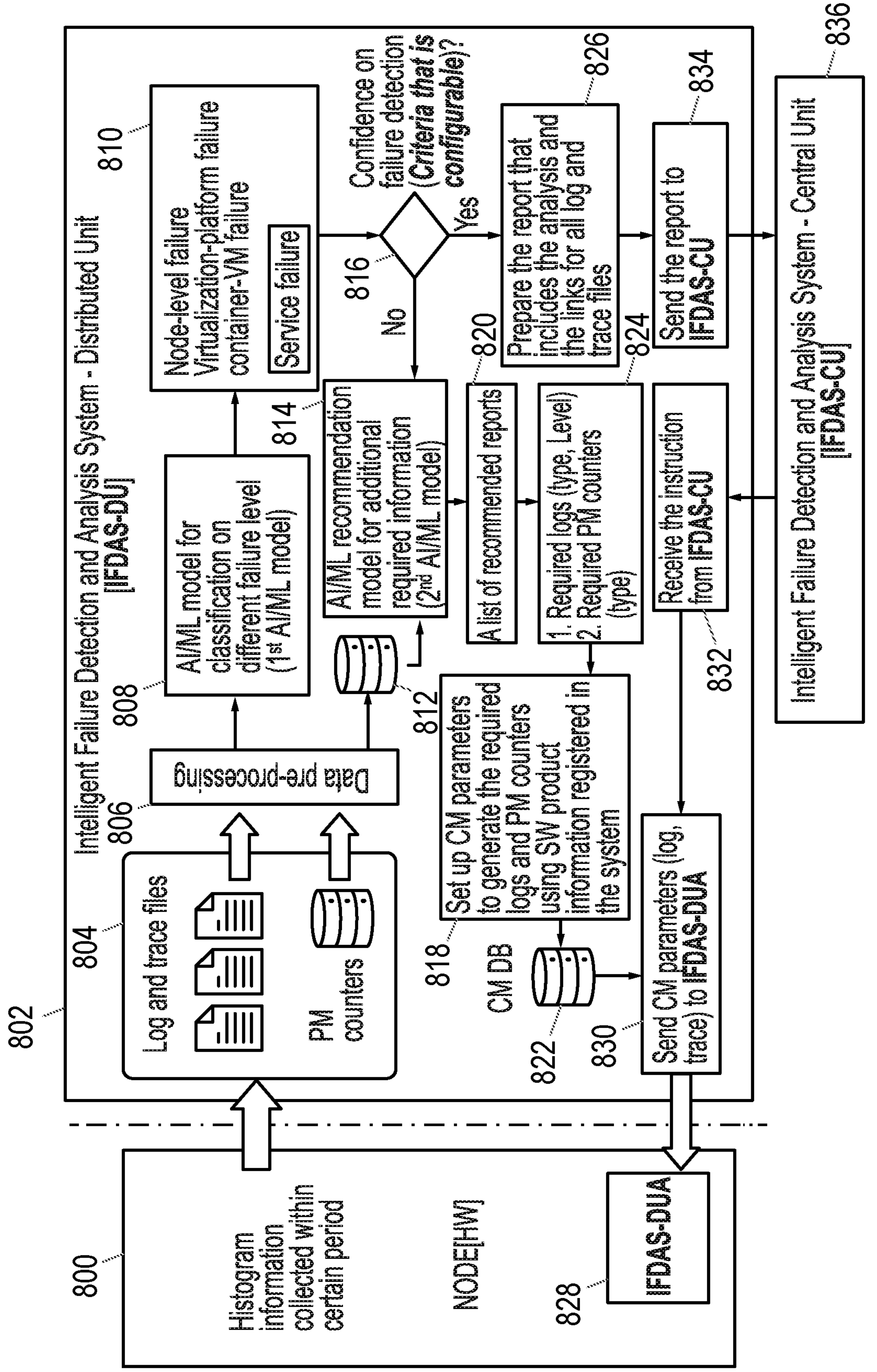
FIGS. 11-18 are schematic illustrations of methods performed according to some embodiments.

FIG. 11 illustrates a method for analysing one or more network attributes of a network according to an embodiment. The method is performed by a system, such as that illustrated in FIG. 10. The system can comprise a DU 802, such as any of the DUs 710, 726, 738 described earlier with reference to FIG. 10. The DU 802 can be configured to perform the method illustrated at blocks 804 to 826 and blocks 830 to 834 of FIG. 11. The system can comprise a (e.g. hardware) network node 800. The network node 800 can comprise a DUA 828, such as the DUA 730 described earlier with reference to FIG. 10. The system can comprise a CU 836, such as the CU described earlier with reference to FIG. 10.

As illustrated at block 804 of FIG. 11, one or more log files, one or more trace files, one or more PM counters, and/or any other datasets are acquired from the network node 800. As illustrated at block 806 of FIG. 11, the datasets are pre-processed to acquire one or more first network attributes of the network. As illustrated at block 808 of FIG. 11, the one or more first network attributes are analysed using a first machine learning model to generate a first output. The first output comprises information about an event (e.g. a failure, such as a SW failure) in the network. For example, the first machine learning model may be trained to classify at which level (e.g. node level, platform level, virtualization or containerization level, or service level) within the network an event occurs.

For the purpose of the illustration, when the trained machine learning model analyses the one or more first network attributes, the trained first machine learning model classifies the level within the network at which the event occurs as the service level. Thus, as illustrated at block 810 of FIG. 11, the first output is an indication that the event occurs at the service level. In some embodiments, other information about the event may be identified at block 808 of FIG. 11 and thus the first output may also comprise other information, such as an indication of when the event occurs.

As illustrated at block 816 of FIG. 11, it can be checked whether an estimated confidence level for the first output is equal to or greater than a confidence level threshold. As described earlier, the confidence level threshold can be configurable. For instance, the confidence level threshold may be set to 50%. The confidence level threshold can be an acceptance criteria. For example, when the confidence level for the first output is equal to or greater than the confidence level threshold, then the first output may be accepted. On the other hand, when the confidence level for the first output is less than the confidence level threshold, then the first output may be rejected.

In more detail, if the estimated confidence level for the first output is less than the confidence level threshold, the method proceeds to block 814 of FIG. 11. As illustrated at block 814 of FIG. 11, if the estimated confidence level for the first output is less than the confidence level threshold, the one or more first network attributes are analysed using a second machine learning model to generate a second output. In an example, it may be that the probability of classifying the event from the first machine learning model into one or more classes fails to meet the confidence level threshold, such as 50%. Thus, it may be that alternative and/or additional information from the network is required. In this example, the identified potential class (e.g. one class or multiple classes if two probabilities are close) for this event together with the provided datasets (e.g. log files, trace files, PM counters and/or any other datasets) comprising the one or more first network attributes are sent to the second machine learning model for analysis.

As illustrated at block 812 of FIG. 11, in some embodiments, the one or more first network attributes may be stored in a memory and subsequently retrieved from the memory for analysis using the second machine learning model at block 814 of FIG. 11. In some embodiments, the second machine learning model can take the information that it receives to build a query and optionally also encode it into a (e.g. digital) representation. The second output generated by the second machine learning model is indicative of one or more second network attributes of the network to analyse using the first machine learning model. Thus, one or more second network attributes are recommended by the second machine learning model. As illustrated at block 820 of FIG. 11, a report on the second output may be generated according to some embodiments.

As illustrated at block 824 of FIG. 11, it may be identified which one or more datasets (e.g. logs, traces, PM counters, etc.) are required in order to acquire the one or more second network attributes. As such, in some embodiments, the second output may be (e.g. a list of) extra and/or alternative datasets to use for the next iteration of applying the first machine learning model. Thus, if the outcome (i.e. the first output) of the first machine learning model does not meet a given criteria (i.e. the confidence level threshold), a second machine learning model can be applied in order to identify which one or more datasets (e.g. logs, traces, PM counters and/or any other datasets) can improve the accuracy of the first machine learning model in the next iteration. That is, the second machine learning model can be applied in order to identify which one or more datasets can improve the estimated confidence level for the output of the first machine learning model. The aim of this is for the estimated confidence level for the output of the first machine learning model to be equal to or greater than the confidence level threshold in the next iteration.

As illustrated at blocks 818 and 830 of FIG. 11, a reconfiguration in the network is initiated for the one or more second network attributes to be acquired. For example, as illustrated at block 818 of FIG. 11, initiating the reconfiguration may comprise generating reconfiguration information indicative of the reconfiguration that is needed in the network to generate the one or more identified datasets. The generation of this reconfiguration information can comprise setting up one or more (e.g. CM) parameters that define the reconfiguration, e.g. that trigger the generation of the one or more identified datasets, such as using SW product information registered in the system. The generation of the reconfiguration information is based on the outcome of the second machine learning model.

As illustrated at block 830 of FIG. 11, initiating the reconfiguration can also comprise transmitting the reconfiguration information to (e.g. the DUA 828 of) one or more network nodes 800 in the network, such as any of those that need to be reconfigured according to the reconfiguration information. For example, the one or more network nodes 800 can be instructed to produce the one or more identified datasets that comprise the one or more second network attributes.

As illustrated at block 822 of FIG. 11, the reconfiguration information may be stored in a memory according to some embodiments and may subsequently be retrieved from the memory for the transmission. As illustrated at block 832 of FIG. 11, in some embodiments, the transmission of the reconfiguration information at block 830 of FIG. 11 may be initiated in response to receiving an instruction to initiate the transmission. As illustrated in FIG. 11, in some embodiments, the instruction may be received from the CU 836. In some embodiments, the instruction can comprise (e.g. CM) parameters for data acquisition (e.g. logging or tracing) on specific services. Thus, after receiving the instruction from the CU 836, the DU 802 may forward these parameters to (e.g. the DUA 828) of the network node 800, i.e. at node level, according to some embodiments.

As described earlier, it can be checked at block 816 of FIG. 11 whether the estimated confidence level for the first output is equal to or greater than the confidence level threshold. If the estimated confidence level for the first output is equal to or greater than the confidence level threshold, the method proceeds to block 826 of FIG. 11. At block 826 of FIG. 11, a report on the first output is generated. For example, the report on the first output may comprise the results of the analysis by the first machine learning model (i.e. the information about the event in the network) and optionally also links for any datasets (e.g. logs, traces, PM counters, and/or any other datasets) from which the one or more first network attributes were acquired. As illustrated at block 834 of FIG. 11, the report on the first output (or a notification indicating that the report on the first output has been generated) may be transmitted towards the CU 836.

If the first machine learning model accurately identifies that the event occurs at node level, platform level, or virtualization/containerization level, the DU 802 may generate the final report for the event, store the final report in a memory (or database) and then notify the CU 836. If the first machine learning model accurately identifies that the event occurs at service level, the DU 802 may include links to the datasets (e.g. log files, trace files, PM counters, and/or any other datasets) in the final report and then transmit the final report towards the CU 836.

In FIG. 11, the method steps are illustrated as being performed by a DU 802, a DUA 828, and a CU 836. It will be understood that the first entity 10 (or, more specifically, the processing circuitry 12 of the first entity 10) described earlier with reference to FIG. 6 may comprise the any one or more of these units 802, 828, 836 and thus the method performed by any one or more of these units 802, 828, 836 can equally be said to be performed by the first entity 10 (or, more specifically, the processing circuitry 12 of the first entity 10).

Figure 12:
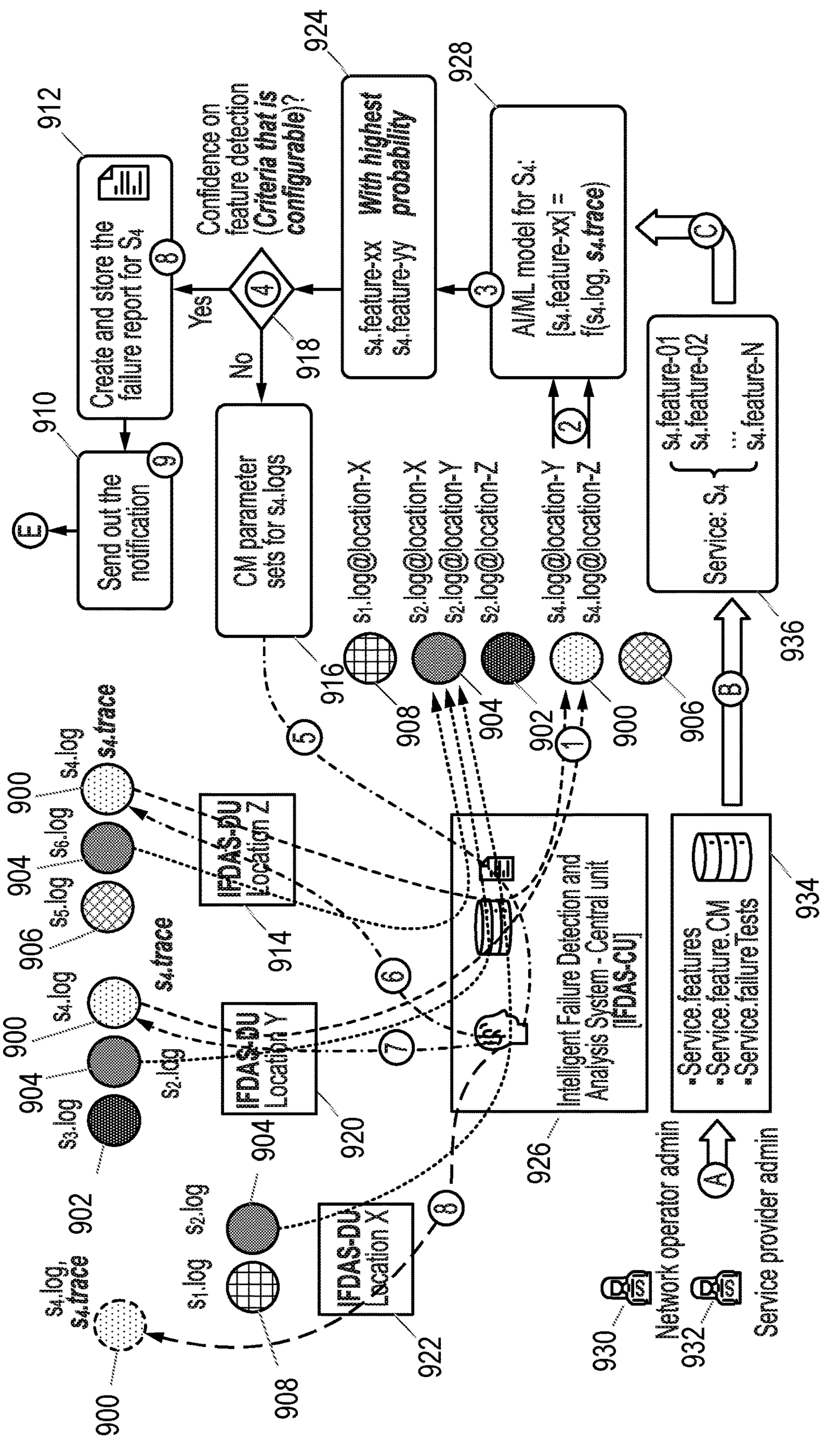

FIG. 12 illustrates a method for analysing one or more network attributes of a network according to an embodiment. The method is performed by a system, such as that illustrated in FIG. 10. The system can comprise one or more DUs 914, 920, 922, such as the DUs 710, 726, 738 described earlier with reference to FIG. 10. The system can comprise a CU 926, such as the CU described earlier with reference to FIG. 10. As illustrated in FIG. 12, each of the DUs 914, 920, 922 may be located at different locations in the network. For example, a first DU 922 may be located at "Location X", a second DU 920 may be located at "Location Y", and a third DU 914 may be located at "Location Z". The different locations in the network may be different geographic locations in the network. The CU 926 can be located at a central location.

As illustrated in FIG. 12, the one or more DUs 914, 920, 922 can acquire one or more datasets (e.g. one or more log files, one or more trace files, one or more PM counters, and/or any other datasets) 900, 902, 904, 906, 908 from the network, e.g. from one or more network nodes of the network. The one or more acquired datasets 900, 902, 904, 906, 908 can be processed by the one or more DUs 914, 920, 922 to acquire one or more first network attributes of the network and the one or more first network attributes may be transmitted by the one or more DUs 914, 920, 922 towards the CU 926. Alternatively, the one or more DUs 914, 920, 922 may transmit the one or more acquired datasets towards the CU 926 and the CU 926 may process the one or more datasets to acquire the one or more first network attributes of the network.

The one or more first network attributes may be acquired from the one or more acquired datasets 900, 902, 904, 906, 908. For example, the one or more acquired datasets 900, 902, 904, 906, 908 can be processed by the one or more DUs 914, 920, 922 to acquire one or more first network attributes of the network and the one or more first network attributes may be transmitted by the one or more DUs 914, 920, 922 towards the CU 926. Alternatively, the one or more DUs 914, 920, 922 may transmit towards the CU 926 the one or more acquired datasets 900, 902, 904, 906, 908 or a report comprising a link to the one or more acquired datasets. For instance, the CU 926 may receive reports from two DUs 920, 914 at two locations (Y and Z) for the service $S_4$. By following the link in a report, the CU 926 can retrieve the associated datasets from storage.

The CU 926 may process the one or more datasets to acquire the one or more first network attributes of the network. At block 928 of FIG. 12, the CU 926 analyses the one or more first network attributes of the network using a first machine learning model to generate, at block 924 of FIG. 12, a first output comprising information about an event (e.g. a failure, such as a service or SW failure) in the network. The information about the event can, for example, be one or more (e.g. a list of) features that led to the event reported in the one or more acquired datasets 900, 902, 904, 906, 908. At block 918 of FIG. 12, it is checked whether an estimated confidence level for the first output is equal to, greater then, or less than a confidence level threshold. If the estimated confidence level for the first output is less than the confidence level threshold, the CU 926 analyses the one or more first network attributes using a second machine learning model to generate a second output. The second output is indicative of one or more second network attributes of the network to analyse using the first machine learning model. The one or more second network attributes of the network can be one or more features of the network that contribute to the event. Thus, by following steps 1-2-3-4 illustrated in FIG. 12, the CU 926 applies the trained machine learning models to identify whether additional and/or alternative information is needed, e.g. to diagnose the event in the network and/or identify a cause of the event in the network.

If the outcome of the trained machine learning models requires the additional and/or alternative information, at block 916 of FIG. 12, the CU 926 may build one or more (e.g. CM) parameter settings that define a reconfiguration in the network for the acquisition (logging and/or tracing) of that information. The CU 926 may transmit the one or more parameter settings to the involved DU(s) 914, 920, 922. For example, if the event is a failure of a service $S_4$, it may be that more detailed information related to $S_4$ is required. In this example, the CU 926 may transmit the one or more parameter settings to the involved DU(s) 914, 920, 922 according to a dynamic footprint of $S_4$ deployment in the network. This procedure can, for example, follow steps 4-5-6 or 4-5-7 illustrated in FIG. 12. In the example relating to the service $S_4$, if $S_4$ has been deployed at location X and removed from location Z at a time when the one or more parameter settings are transmitted, the one or more parameter settings will be transmitted to the DU 922 at location X. In this case, no parameter settings are sent by the CU 926 to the DU 914 at location Z. Instead, the steps 4-5-8 illustrated in FIG. 12 are taken instead. This is the scenario that represents the dynamic change of the footprint for $S_4$ in the network.

If the estimated confidence level for the first output is equal to or greater than the confidence level threshold (e.g. the information about the event in the network is provided by the first machine learning model with a high probability), at block 912 of FIG. 12, the CU 926 may create a report (e.g. a TR) and store the report in a memory (or database). At block 910 of FIG. 12, the CU 926 may transmit a notification that the report has been generated, e.g. to a SW designer (at the third level of support mentioned earlier) in the case of the event being a SW failure. This procedure follows steps 4-8-9-E illustrated in FIG. 12.

A network operator administrator 930 or a service provider administrator 932 may be responsible for defining one or more features related to a service to be offered, as illustrated at block 934 of FIG. 12. This administrator 930, 932 can also provide the training datasets that can be used to train the machine learning models (e.g. for the service), as illustrated at block 936 of FIG. 12. The procedure to train the machine learning models follows steps A-B-C illustrated in FIG. 12.

In FIG. 12, the method steps are illustrated as being performed by one or more DUs 914, 920, 922 and a CU 926. It will be understood that the first entity 10 (or, more specifically, the processing circuitry 12 of the first entity 10) described earlier with reference to FIG. 6 may comprise any one or more of these units 914, 920, 922, 926 and thus the method performed by any one or more of these units 914, 920, 922, 926 can equally be said to be performed by the first entity 10 (or, more specifically, the processing circuitry 12 of the first entity 10). The second entity 20 (or, more specifically, the processing circuitry 22 of the second entity 20) described earlier with reference to FIG. 8 may perform training of the machine learning models that is illustrated in FIG. 12.

Figure 13:
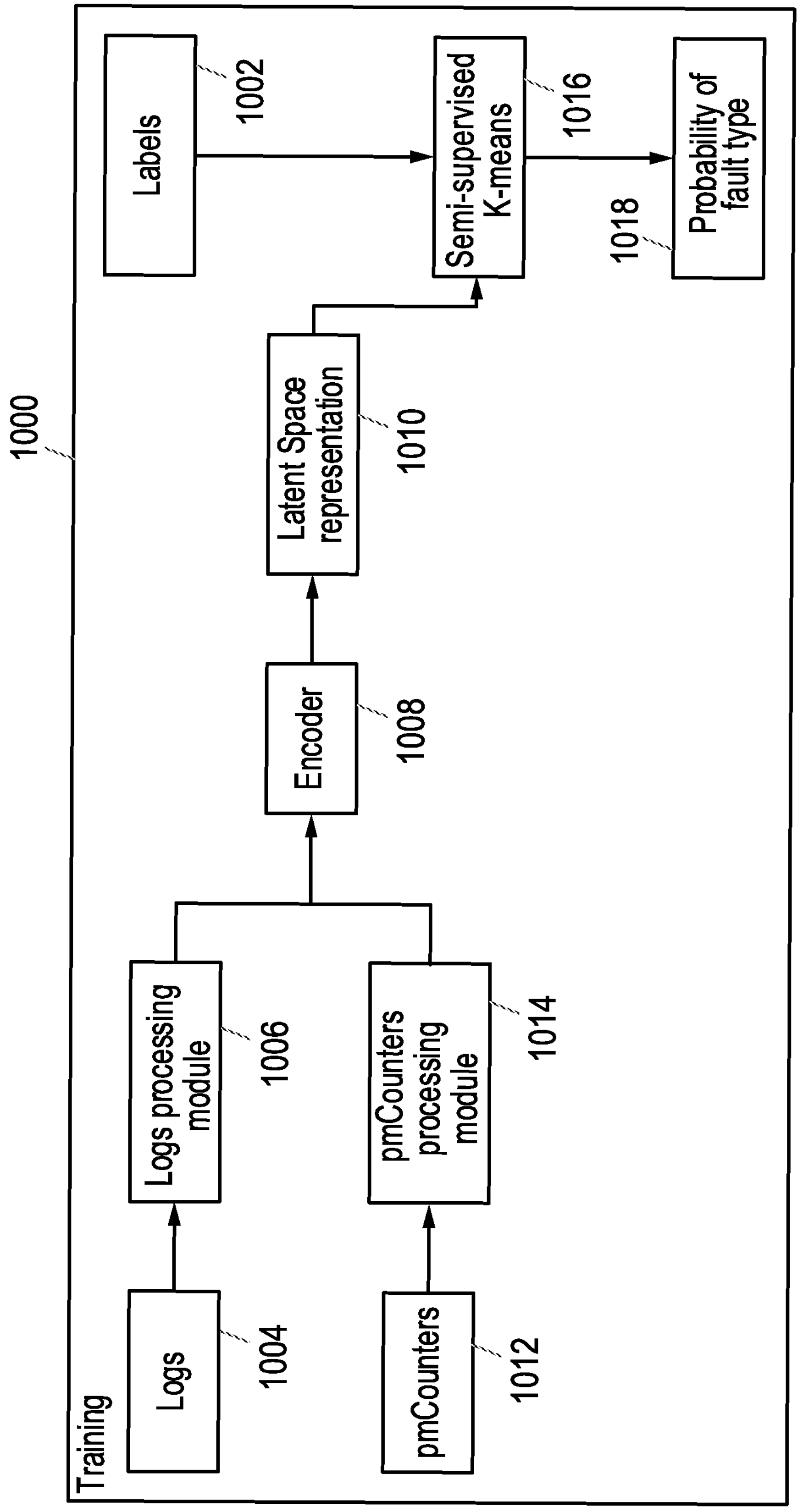

FIG. 13 illustrates a method for training 1000 a machine learning model to analyse one or more network attributes of a network according to an embodiment. More specifically, FIG. 13 illustrates a method for training the first machine learning model referred to herein. The second entity 20 (or, more specifically, the processing circuitry 22 of the second entity 20) described earlier with reference to FIG. 8 may perform the method of FIG. 13.

As described earlier, the first machine learning model can be trained to generate a first output comprising information about an event in the network, e.g. classifying a fault in the network. The first machine learning model can be trained to generate the first output based on one or more first network attributes of the network that are provided as input. The one or more first network attributes of the network can be acquired from one or more datasets, such as one or more log files, one or more trace files, one or more PM counters, and/or any other datasets.

As illustrated at blocks 1004 and 1012 of FIG. 13, the one or more datasets (e.g. one or more logs at block 1004 of FIG. 13 and one or more PM counters at bock 1012 of FIG. 13) are fed into the flow. That is, the one or more datasets are acquired from the network, e.g. from one or more network nodes of the network. The one or more datasets may comprise data (specifically, network attributes) acquired during a predefined time interval. In the case of multiple datasets, the multiple datasets may each comprise data acquired during the same predefined time interval. As illustrated in FIG. 13, the one or more datasets can be input into one or more processing modules. The second entity 20 (or, more specifically, the processing circuitry 22 of the second entity 20) described earlier with reference to FIG. 8 can comprise the one or more processing modules.

As illustrated at blocks 1006 and 1014 of FIG. 13, the datasets (e.g. the one or more logs at block 1006 of FIG. 13 and the one or more PM counters at block 1014 of FIG. 13) may be processed by one or more processing modules. In some embodiments, such as that illustrated in FIG. 13, each type of dataset (e.g. logs or PM counters) may be processed by a different processing module. In other embodiments, a single processing module may process all types of datasets. The one or more processing modules process the datasets to acquire one or more first network attributes. Thus, the output from the one or more processing modules is the one or more first network attributes. The one or more first network attributes can be input into an encoder, such as an autoencoder or a multi-input autoencoder.

As illustrated at block 1008 of FIG. 13, the one or more first network attributes may be encoded by the encoder. For example, the one or more first network attributes may be encoded into one or more vector representations (or a vector form). The encoder can exploit a (e.g. inherent) correlation between vector representations by mapping them into a lower dimensional space, as illustrated at block 1010 of FIG. 13. Thus, the one or more first network attributes can be mapped into a lower dimension space in this way. The lower dimensional space can be referred to as a latent space representation. The process of encoding can enable multiple (e.g. two) diverse sources of correlated data (e.g. logs and PM counters) to be combined. The process of mapping into a lower dimensional space can enable easier application of machine learning processes, such as clustering processes (e.g. semi-supervised clustering processes).

As illustrated at block 1016 of FIG. 13, in some embodiments involving a plurality of first network attributes, the plurality of first network attributes may be grouped into a plurality of clusters. In some embodiments, the grouping may be performed using a (e.g. semi-supervised) clustering process. The clustering process may be a (e.g. semi-supervised) k-means clustering process according to some embodiments. As illustrated at block 1002 of FIG. 13, in some embodiments, a label may be assigned to each cluster of the plurality of clusters. As illustrated at block 1018 of FIG. 13, the output of the grouping (e.g. clustering) process is information about an event in the network, such as classification of a type of fault in the network.

Figure 14:
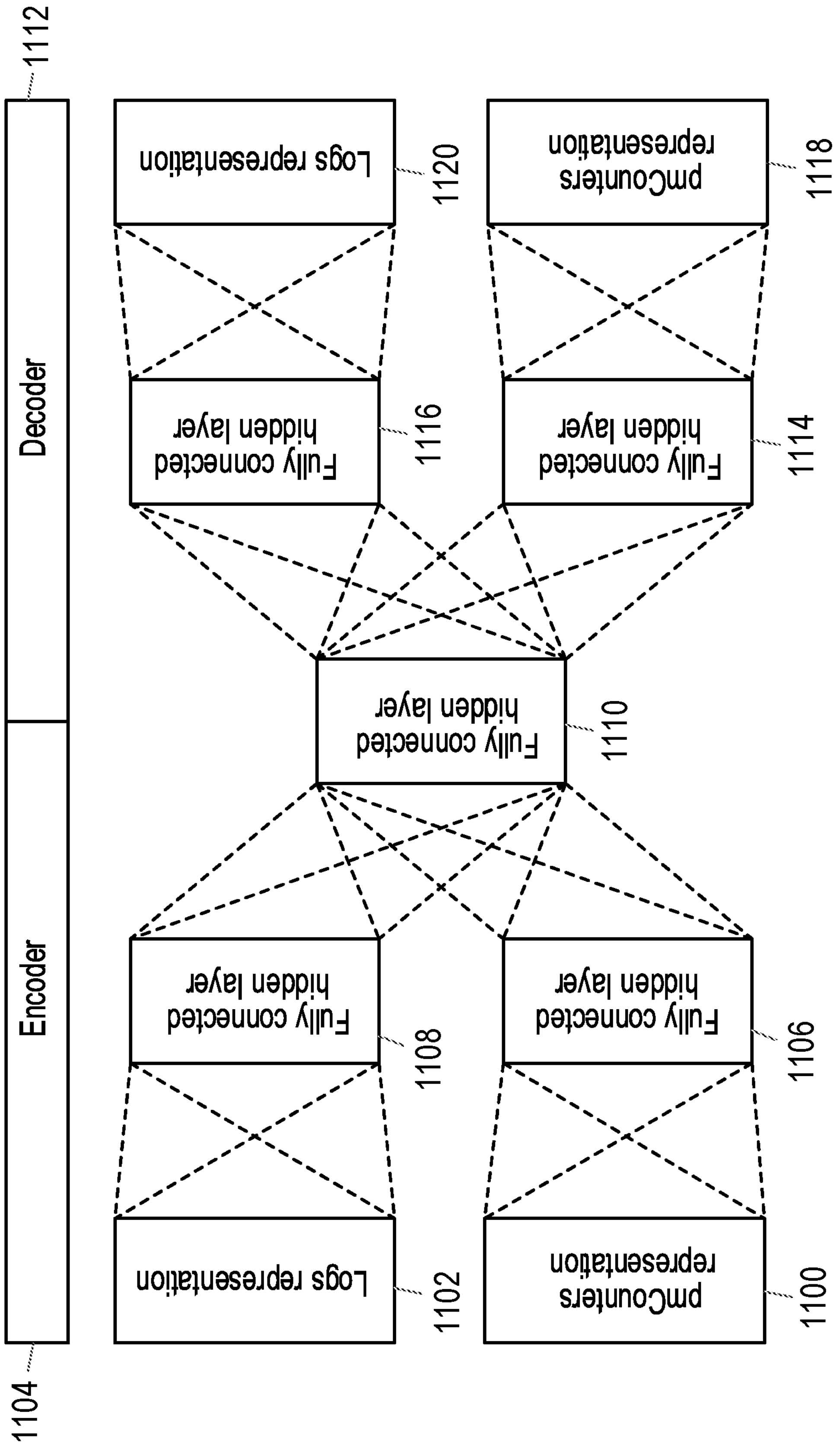

FIG. 14 illustrates a method performed according to an embodiment. More specifically, FIG. 14 illustrates a method of encoding and optionally also decoding one or more network attributes. As illustrated in FIG. 14, the encoding may be performed by an encoder 1104 and the decoding may be performed by a decoder 1112. The encoder 1104 can be the encoder described earlier with reference to FIG. 13. In some embodiments, the encoder may be an autoencoder, such as a multi-input autoencoder 1104.

One or more datasets are used as inputs into the encoder 1104. As mentioned earlier, the one or more datasets may comprise data (specifically, network attributes) acquired during a predefined time interval. In the case of multiple datasets, the multiple datasets may each comprise data acquired during the same predefined time interval. For example, the multiple datasets may comprise PM counter values accumulated during the predefined time interval as well as logs recorded during the same time interval. The one or more first network attributes of the network are acquired from the one or more datasets. The encoder 1104 can capture the latent space representation of the one or more first network attributes.

In more detail, as illustrated at blocks 1100 and 1102 of FIG. 14, and as described earlier with reference to FIG. 13, the one or more first network attributes acquired from the one or more datasets may be encoded into a (e.g. vector) representation. As illustrated at blocks 1106, 1108, 1110 of FIG. 14, the encoder 1104 can capture (e.g. inherent) relationships between the one or more first network attributes from the one or more datasets, such as relationships between the one or more first network attributes from different types of datasets (e.g. relationships between the one or more first network attributes from the PM counters and the one or more first network attributes from the logs) and/or relationships between the one or more first network attributes from the same type of dataset (e.g. relationships between the one or more first network attributes from the PM counters and/or relationships between the one or more first network attributes from the logs). These relationships can be referred to as a hidden layer or a fully connected hidden layer.

The latent space representation of the one or more first network attributes, which is generated by the encoder 1104, can be used as the input into the first and/or second machine learning model referred to herein according to some embodiments. Thus, in some embodiments, the encoder 1104 can provide the input for the first and/or second machine learning model referred to herein. As described earlier, the first machine learning model is trained to generate a first output comprising information about an event (e.g. a fault) in a network, such as a type of the event or a status of the event. The status of the event may even be an indication that there is no such event. The first output can be generated for a corresponding timestamp.

In embodiments where decoding is performed, as illustrated at blocks 1114, 1116, 1118, and 1120 of FIG. 14, the decoder 1112 can decode the latent space representation of the one or more first network attributes. That is, the work of the encoder can be reversed.

The second entity 20 (or, more specifically, the processing circuitry 22 of the second entity 20) described earlier with reference to FIG. 8 can comprise the encoder 1104 and/or the decoder 1112 according to some embodiments. Thus, in some embodiments, the second entity 20 (or, more specifically, the processing circuitry 22 of the second entity 20) may be configured to perform the method described with reference to FIG. 14.

Figure 15:
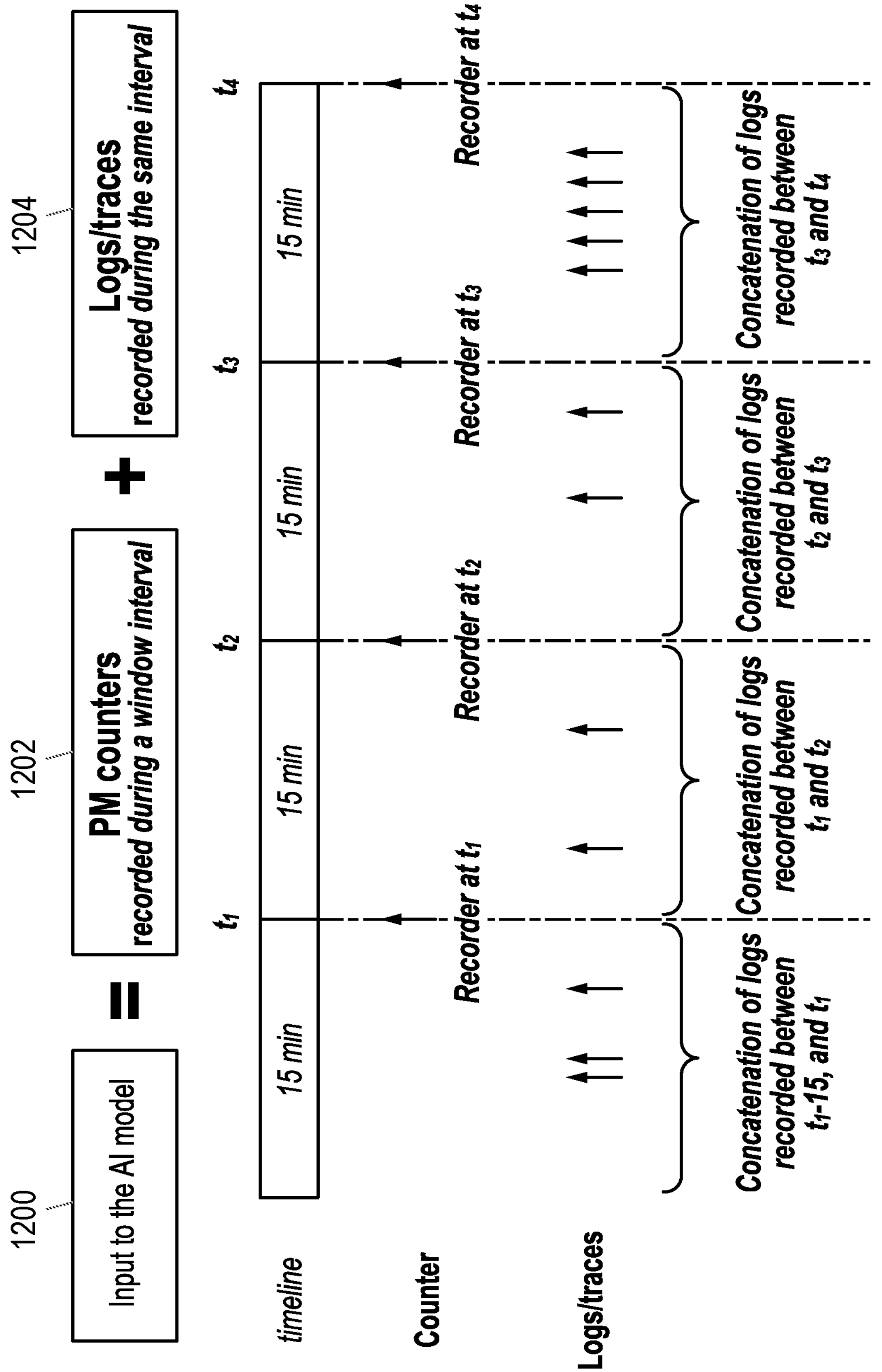

FIG. 15 illustrates a method performed according to an embodiment. More specifically, FIG. 15 illustrates a method of acquiring data (specifically, the first or second network attributes referred to herein) from one or more datasets. The acquired data can provide the input 1200 into the first and/or second machine learning model referred to herein. In the embodiment illustrated in FIG. 15, the one or more datasets comprise one or more PM counters 1202 and one or more logs/traces 1204. However, it will be understood that any other dataset and any combination of datasets can be acquired in the manner described with reference to FIG. 15.

As illustrated in FIG. 15, data from the one or more PM counters is recorded over at least one (e.g. 15 minute) time interval. In particular, data from the one or more PM counters may be recorded at a first time $t_1$, a second time $t_2$, a third time $t_3$, and a fourth time $t_4$. The data recorded at the first time $t_1$ can comprise data recorded during a first time interval $t_0$ to $t_1$, the data recorded at the second time $t_2$ can comprise data recorded during a second time interval $t_1$ to $t_2$, the data recorded at the third time $t_3$ can comprise data recorded during a third time interval $t_2$ to $t_3$, and the data recorded during the fourth time $t_4$ can comprise data recorded during a fourth time interval $t_3$ to $t_4$. In the embodiment illustrated in FIG. 15, the data from the one or more PM counters can thus be organised in a time series.

As also illustrated in FIG. 15, data from the one or more logs/traces is recorded over at least one (e.g. 15 minute) time interval. In particular, data from the one or more logs/traces may be recorded at the first time $t_1$, second time $t_2$, third time $t_3$, and fourth time $t_4$. The data recorded at the first time $t_1$ can comprise data recorded during the first time interval $t_0$ to $t_1$, the data recorded at the second time $t_2$ can comprise data recorded during the second time interval $t_1$ to $t_2$, the data recorded at the third time $t_3$ can comprise data recorded during the third time interval $t_2$ to $t_3$, and the data recorded during the fourth time $t_4$ can comprise data recorded during the fourth time interval $t_3$ to $t_4$. In the embodiment illustrated in FIG. 15, the data from the one or more logs/traces can thus be organised in a time series.

As mentioned earlier, the data is specifically the first or second network attributes referred to herein. Thus, in some embodiments such as that illustrated in FIG. 15, the one or more network attributes referred to herein may comprise at least two network attributes and the at least two network attributes can be in a time series. In this way, network attributes corresponding to the same time interval can be grouped together before being input into the first machine learning model referred to herein. Although the embodiment illustrated in FIG. 15 includes four time intervals, it will be understood that this is only one example and other examples can include a single time interval, two time intervals, three time intervals, or more than four time intervals.

Table 1 below illustrates an example of values from some PM counters ("PM counter A" and "PM counter B"), which are acquired at a plurality of predefined time intervals. In the example, each predefined time interval is a 15 minute time interval. The acquired PM counter values are in their raw format as a time series of values.

TABLE 1

An example of PM counter values.

| Time stamp (n) | PM counter A | PM counter B |
|---|---|---|
| 2020-01-13 18:00:00 | 100 | 0.5 |
| 2020-01-13 18:15:00 | 98 | 0.6 |
| 2020-01-13 18:30:00 | 189 | 0.7 |
| 2020-01-13 18:45:00 | 88 | 0.5 |
| 2020-01-13 19:00:00 | 221 | 0.9 |

It can be beneficial to convert logs into a time series format. This can be achieved by aggregating log values to the same granularity as the PM counter values. Table 2 illustrates an example of some logs which are acquired at the same plurality of predefined (15 minute) time intervals as the PM counter values of Table 1.

TABLE 2

An example of logs.

| Time stamp (n) | Logs accumulated during n-15 to n time stamp |
|---|---|
| 2020-01-13 18:00:00 | 0001: [2020-01-13 18:024:32.981123386] (+0.000005172) du1 com_ericsson_triobjif: TRACE2: {cpu_id = 7}, {processAndObjif = "nc_main_thread(-)", fileAndLine = "ncRbsUnitFactory.cc:559", msg = "RbsUnitFactory : Link Ldn=[ManagedElement=1, Equipment=1,RiLink=19] found in cache." } |
| 2020-01-13 18:15:00 | ... |
| 2020-01-13 18:30:00 | ... |
| 2020-01-13 18:45:00 | ... |
| 2020-01-13 19:00:00 | ... |

However, as can be seen from the above Tables 1 and 2, even though the PM counters and logs may be collected during the same time intervals, they can differ quite significantly in nature and format. For example, PM counters are generally time driven whereas logs are generally action driven, PM counters are typically continuously recorded at certain time intervals whereas logs are commonly recorded in response to a trigger (e.g. by a network event such as a fault/crash or by a script like a trace), PM counters usually have a fixed granularity (e.g. values collected every 15 minutes) whereas the granularity of logs usually depends on the type of logging (e.g. logs are typically collected continuously for a system health-check), and PM counters are numerical in nature (e.g. in a tabular format) whereas logs can comprise text data (e.g. high domain-specific vocabulary). Also, PM counters may contain empty values (e.g. timestamps may be missing due to a system error) and logs may also contain empty values but, different to PM counters, logs can include texts that are of different formats (and different logs can have different formats in general).

Rather than using a raw input from a dataset (e.g. logs, PM counters, and/or any other dataset) for the first and/or second machine learning model referred to herein, the raw input may first be converted into a machine-readable language. Due to the differences between the types of inputs in terms of their nature and/or format, different processing methods may be used to handle different inputs, such as the numerical inputs from PM counters and the textual inputs from logs.

Figure 16:
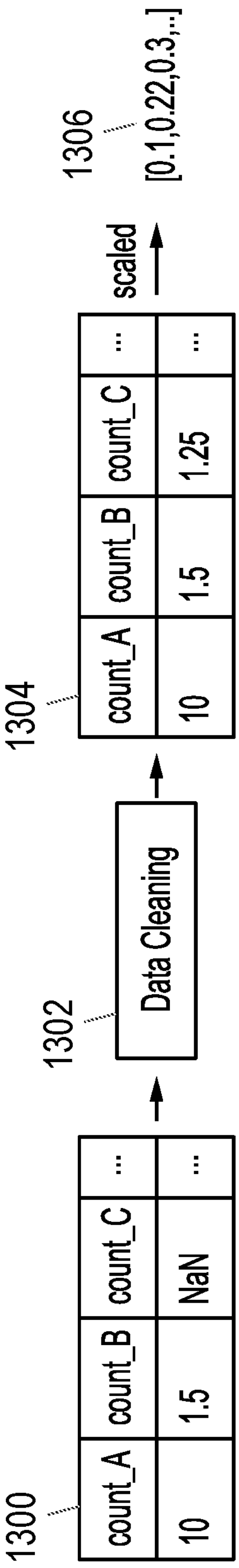

FIG. 16 illustrates a method performed according to an embodiment. More specifically, FIG. 16 illustrates an example method of processing a raw input 1300 comprising a plurality of network attributes from a PM counter. The raw input 1300 can comprise a timeseries of network attributes. As illustrated in FIG. 16, the raw input 1300 comprises three network attributes, the first two of which are a number (or value) and the third of which is not a number (NaN).

As illustrated in FIG. 16, the processing of the raw input 1300 comprises a data cleaning step 1302 to generate a cleaned input 1304. The data cleaning step 1302 may comprise generating a value for any network attribute that is NaN. Such value generation can be implemented using counter wise forward fill (or average mean), computing missing rows to ensure the (e.g. time series) data is continuous, and/or substituting outlier values and other entries that do not fit counter statistics. The processing of the raw input 1300 may also comprise scaling the cleaned input 1304 to obtain a scaled input 1306. For example, each network attribute in the cleaned input 1304 can be scaled. The scaling can help to prevent (e.g. large gradient) errors during the training of the machine learning models and/or the use of the trained machine learning models. The cleaned input 1304 may be scaled using a standard scaler, a min-max scaler, and/or any other scaler. The scaled input 1306 can be used as the input for the first and/or second machine learning model referred to herein.

Figure 17:
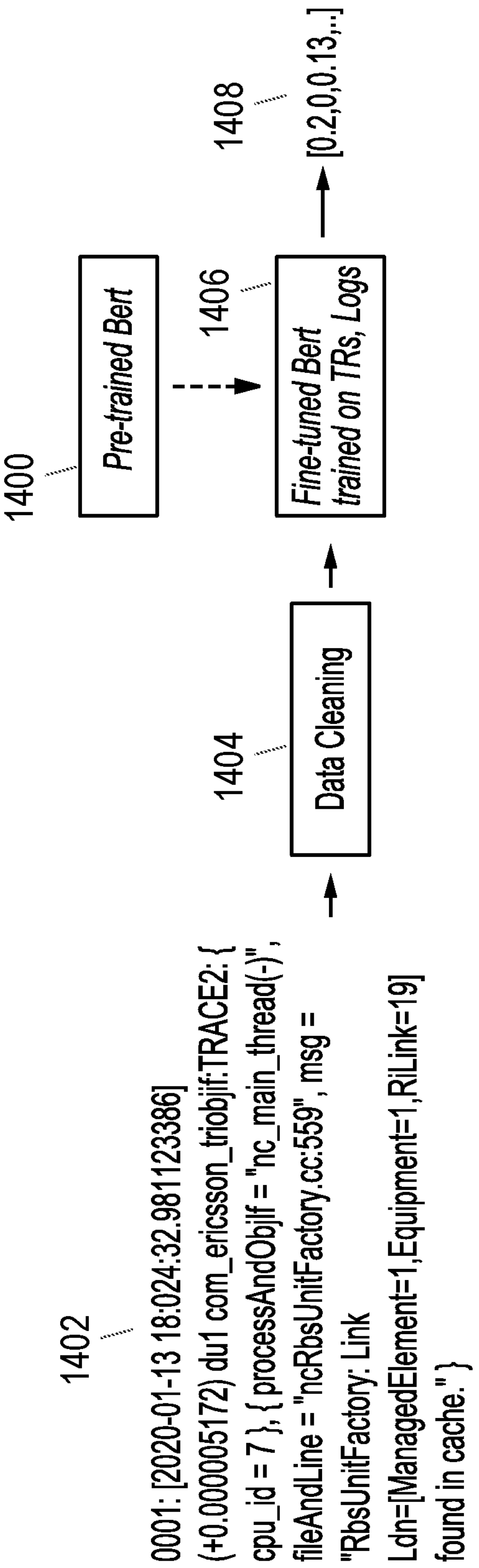

FIG. 17 illustrates a method performed according to an embodiment. More specifically, FIG. 17 illustrates an example method of processing a raw input 1402 comprising a plurality of network attributes from a log/trace file.

As illustrated in FIG. 17, the processing of the raw input 1402 comprises a data cleaning step 1404 to generate a cleaned input. The raw input 1402 comprises text features. Text features can require more extensive cleaning than numerical features as text features do not follow a particular format. In the embodiment illustrated in FIG. 17, the data cleaning step 1404 may comprise removing certain features such as log-specific formats, dates, and/or long strings of numbers. These features may be considered to be of no value to generating information about an event (e.g. a fault) in a network. The features may be removed using regex parsers or any other suitable technique.

The processing of the raw input 1402 may also comprise an embedding step 1406 that generates a representation (e.g. an embedding) 1408 of the cleaned input. For example, the embedding step 1406 can comprise passing the cleaned input through a bidirectional encoder representations (BERT) model or any other suitable model to generate the representation 1408 of the cleaned input. In some embodiments, a backbone pre-trained (e.g. BERT) model may be acquired at block 1400 of FIG. 17 and the model may be fine-tuned, such as on domain-specific data from reports (e.g. TRs) and/or logs. Then, at block 1406 of FIG. 17, the cleaned input can be passed through the fine-tuned (e.g. BERT) model to generate the representation 1408 of the cleaned input. At block 1406 of FIG. 17, the model may convert the text features into a series of numerical digits to generate the representation 1408 of the cleaned input. The representation 1408 of the cleaned input can be used as the input for the first and/or second machine learning model referred to herein.

In some embodiments, where a raw input is processed prior to training the first and/or second machine learning model referred to herein, the processed numerical and/or textual data can then be fed as input into the encoder 1008, 1104 described earlier to learn the latent representation of the one or more network attributes. This phase of the operation can be completely autonomous with the aim of minimising errors between the input to the encoder 1008, 1104 and the output of the decoder 1112.

FIGS. 18 to 23 relate to the training phase of the techniques described herein. More specifically, FIGS. 18 to 23 illustrate an example of how to build the second training dataset mentioned earlier, which can be used to train the second machine learning model referred to herein according to some embodiments.

Figure 18:
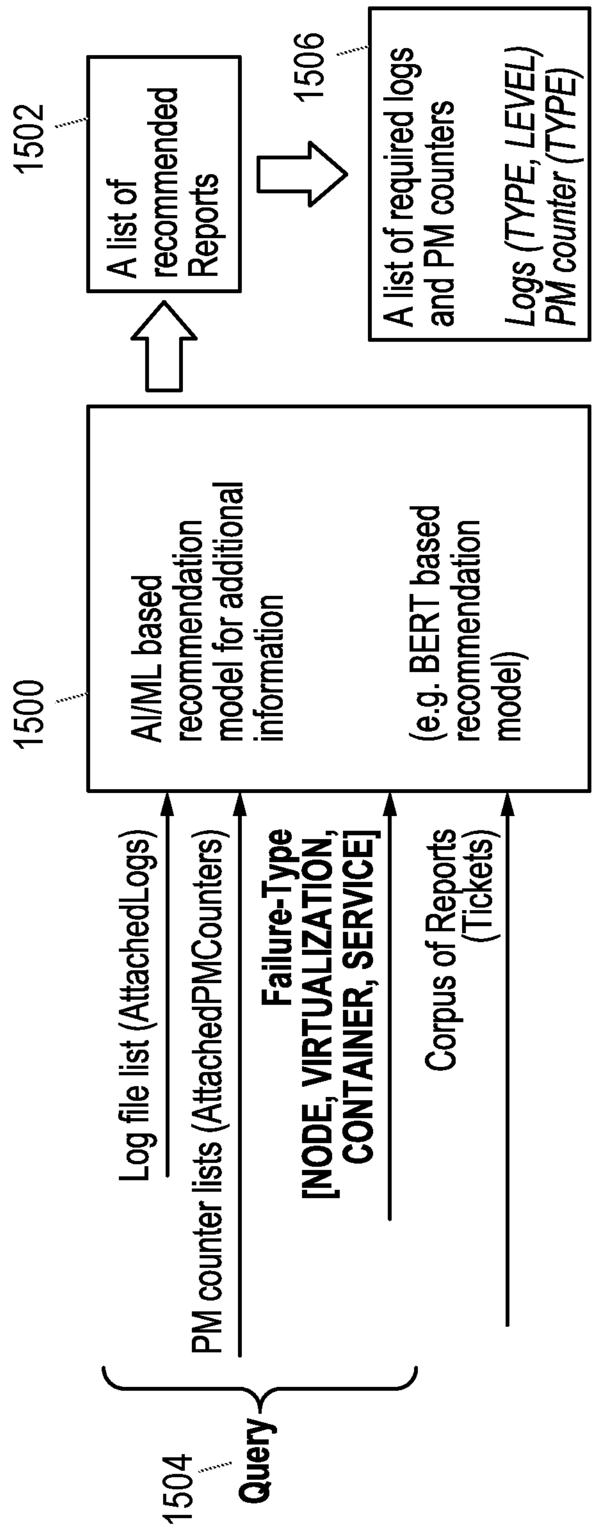

FIG. 18 illustrates a method performed according to an embodiment. More specifically, FIG. 18 illustrates an example method of how to build a second training dataset to train the second machine learning model referred to herein.

In the embodiment illustrated in FIG. 18, there are two inputs to the second machine learning model 1500. One of the inputs is a query 1504 and the other input is a corpus of reports (or tickets), such as trouble reports (TRs). A corpus of reports can be built with corresponding different queries for the reports. The corpus of reports and/or the corresponding queries can then be stored in a memory (e.g. a repository). Thus, the query 1504 and the corpus of reports input into the second machine learning model 1500 can be retrieved from such a memory.

The reports provide a dataset, which can comprise data indicative of past experience. The query 1504 itself can also be indicative of past experience. In the example illustrated in FIG. 18, the query 1504 comprises three inputs. One of the inputs of the query is a list of log files (e.g. access log, system log, and/or trace file, etc.). Another of the inputs of the query is a list of PM counter types (e.g. accessibility, integrity, availability, computation, memory, and network bandwidth, etc.). Another of the inputs of the query is an event (e.g. failure) type and/or modules impacted by the event. In some embodiments, the impacted modules can be used to train the second machine learning model 1500 since it comprises more information about the involved products. The event type may comprise one or more elements, such as any one or more of the levels mentioned earlier at which an event may occur.

The query 1504 and/or the reports may be processed prior to inputting them into the second machine learning model 1500. For example, in some embodiments, the query 1504 and/or the reports may be digitised prior to input into the second machine learning model 1500, such as according to the method that will be described later with reference to FIGS. 21 and 22. In some embodiments, the (e.g. digitised) query 1504 and reports may be combined (e.g. concatenated) as one input for the second machine learning model 1500. Alternatively or in addition, in some embodiments, the (e.g. digitised) query 1504 and/or reports may be embedded prior to input into the second machine learning model 1500. The embedding can be performed using a tokenisation process, such as that which will be described later with reference to FIG. 20.

The second machine learning model 1500 is trained using the input query 1504 and reports. Thus, according to the example illustrated in FIG. 18, the query 1504 and the reports form the second dataset referred to herein. As described earlier, the second machine learning model 1500 is trained to analyse one or more first network attributes to generate a second output if an estimated confidence level for the first output is less than a confidence level threshold The second machine learning model 1500 may, for example, be trained by applying a bidirectional encoder representations (BERT) process. The second output is indicative of one or more second network attributes of the network to analyse using the first machine learning model.

For example, as illustrated at block 1502 of FIG. 18, the output of the second machine learning model 1500 may be a list of recommended reports that are required in order to acquire the one or more second network attributes referred to herein. As illustrated at block 1506 of FIG. 18, the output of the second machine learning model 1500 may alternatively or additionally be one or more datasets that are required in order to acquire the one or more second network attributes referred to herein. These required datasets can, for example, comprise logs, traces, PM counters, and/or any other required datasets.

When the trained second machine learning model is used for inference, the information about an event in a network (e.g. an event type) can be taken to form a query. The information about the event can, for example, be one of {NODE, VIRTUALIZATION, CONTAINER, SERVICE}. The information about the event is determined by the categories in the first machine learning model referred to herein.

Although not illustrated, the method of how to build a first training dataset to train the first machine learning model referred to herein can be implemented in a similar manner to that described with reference to FIG. 18 for the second training dataset to train the second machine learning model referred to herein.

FIG. 19 illustrates an example of a report (or ticket) 1600 or, more specifically, the format of data in such a report. The corpus of reports referred to earlier with reference to FIG. 18 can comprise such a report. In the example illustrated in FIG. 19, the report comprises six different attributes, which may be extended to include any customised attribute if required. Each attribute may have zero or several elements. The report may at least comprise the element that indicates the module type. This element can be indicative of the level in the network at which the module impacted by the event is located. This can be linked to the categories in the first machine learning model referred to herein.

The output of the second machine learning model can be a list of reports related to a query. From those related reports, the corresponding attached datasets (e.g. logs, traces, PM counters, and/or any other datasets) are retrieved. Then, the comparison between the datasets in the current query and those in the related reports can be made and the one or more second network attributes (e.g. alternative and/or additional information required) in terms of the datasets can be identified, e.g. as illustrated in FIG. 18.

Figure 20:
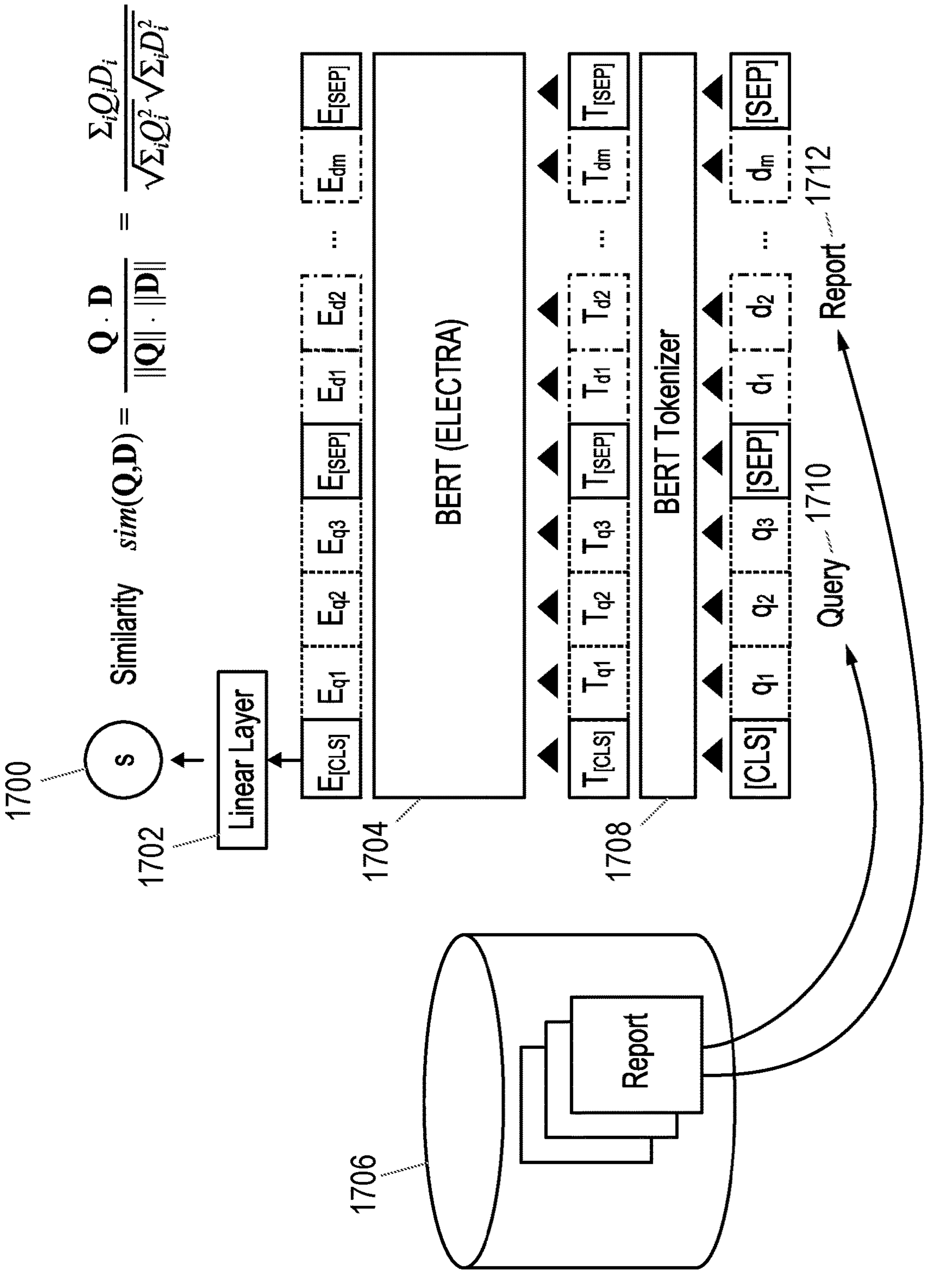
FIG. 20 is a schematic illustration of a method performed according to an embodiment.

FIG. 20 illustrates an example method performed according to an embodiment. More specifically, FIG. 20 illustrates an example of implementing the second machine learning model referred to herein. For the purpose of the example, the second machine learning model is a pre-trained BERT based machine learning model. In more detail, the second machine learning model in this example is a two-input classification BERT model with a linear layer on top.

As illustrated in FIG. 20, the input of the second machine learning model comprises a query 1710, a report 1712, and one or more tokens. The query 1710 and/or the report 1712 may be retrieved from a memory (e.g. repository) 1706 according to some embodiments. The tokens can, for example, comprise one or more tokens relating to separation [September] and/or one or more tokens relating to classification [CLS]. In the input, the [CLS] token is first, then the query 1710, then a first [September] token, then the report 1712, and finally a second [September] token. At block 1708 of FIG. 20, the input sequence is tokenised and the tokenised input sequence is then forwarded to the second (BERT based) machine learning model.

At block 1704 of FIG. 20, the second machine learning model generates contextual embeddings for all of the tokens. Next, the second machine learning model takes the contextual embedding of the [CLS] token and forwards it to a (e.g. single) linear layer at block 1702 of FIG. 20. As illustrated at element 1700, the linear layer outputs a scalar value S. This scalar value may, for example, indicate the probability of the report being relevant to the query. As illustrated in FIG. 20, these probabilities may be used as a similarity score to rank the related reports.

FIG. 21 illustrates an example of a report 1800. More specifically, FIG. 21 illustrates an example of building a report sentence. Based on the information retrieved from the report illustrated in FIG. 19, a single string for the report can be created. The created string can comprise the information illustrated in FIG. 21. As illustrated in FIG. 21, tokens (in this example, two tokens) can be used to separate different attributes.

FIG. 22 illustrates an example of a query 1900. The query can be used for training the second machine learning model described herein. Based on the information retrieved from the report illustrated in FIG. 19, a single query can be created. The created query can comprise attachedLogs and attachedPMCounters as well as ImpactModuleType, as illustrated in FIG. 22. Each attribute in the created query may be a list, which can contain zero or multiple elements. The created query can be used to train the second (e.g. BERT based) machine learning model referred to herein. When the second machine learning model is used in the system illustrated in FIG. 11, the query may be built in a manner that is different from that used for training the second machine learning model. An example of this is illustrated in FIG. 23, where "Failure-Type" is used in the query.

FIG. 23 illustrates an example of a query 2000. The query 2000 can be used for the second machine learning model inference described herein.

In some embodiments, the first and/or second machine learning models referred to herein can be trained off-line, i.e. as "off-line" models. A model training pipeline that can be used can comprise collecting datasets, training the model, and delivering the trained model (e.g. to one or more involved nodes in the network). The first and/or second trained machine learning models can be integrated into a DU.

Figure 24:
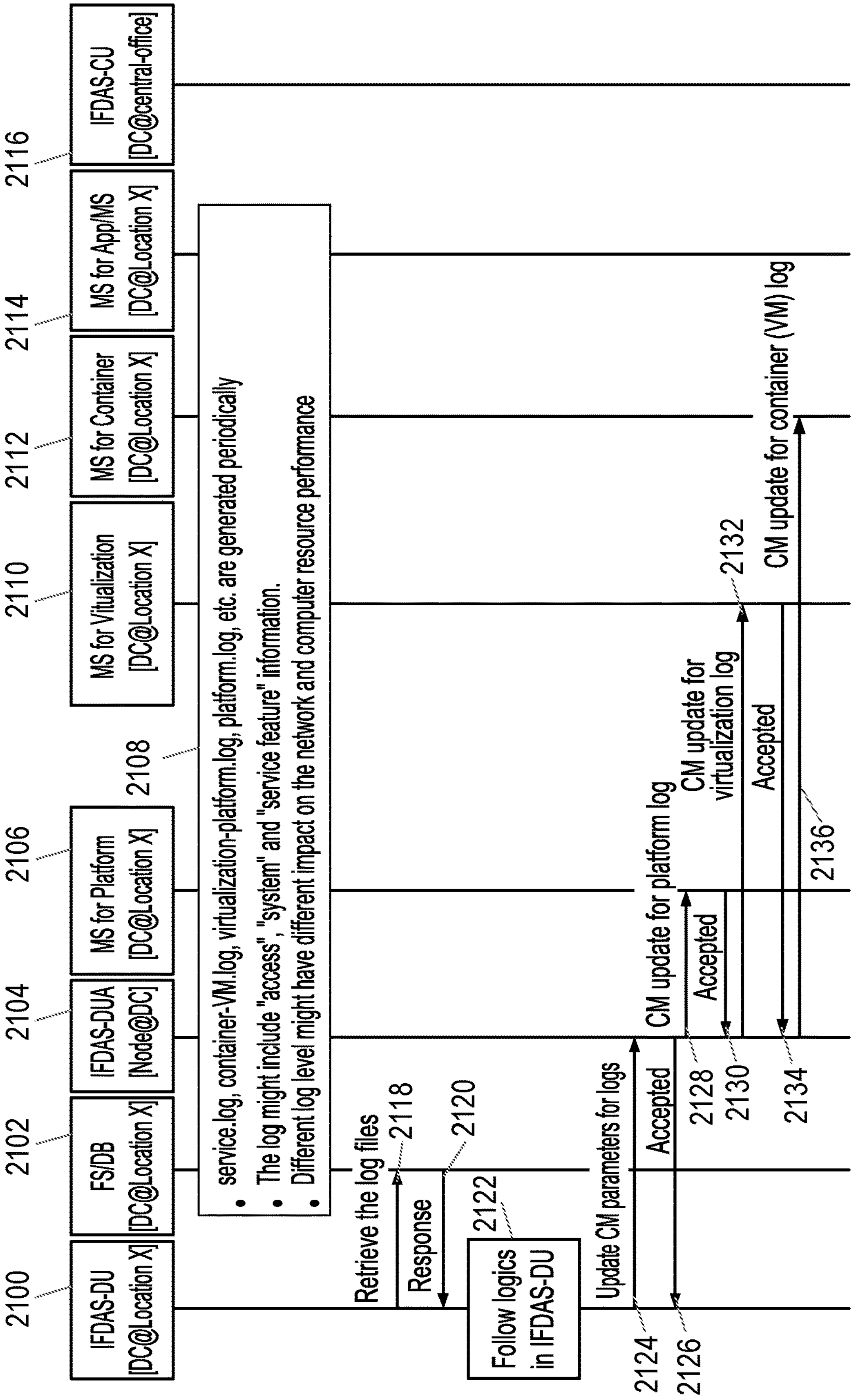
FIG. 24 is a signalling diagram illustrating an exchange of signals in a system according to an embodiment.
Figure 24:
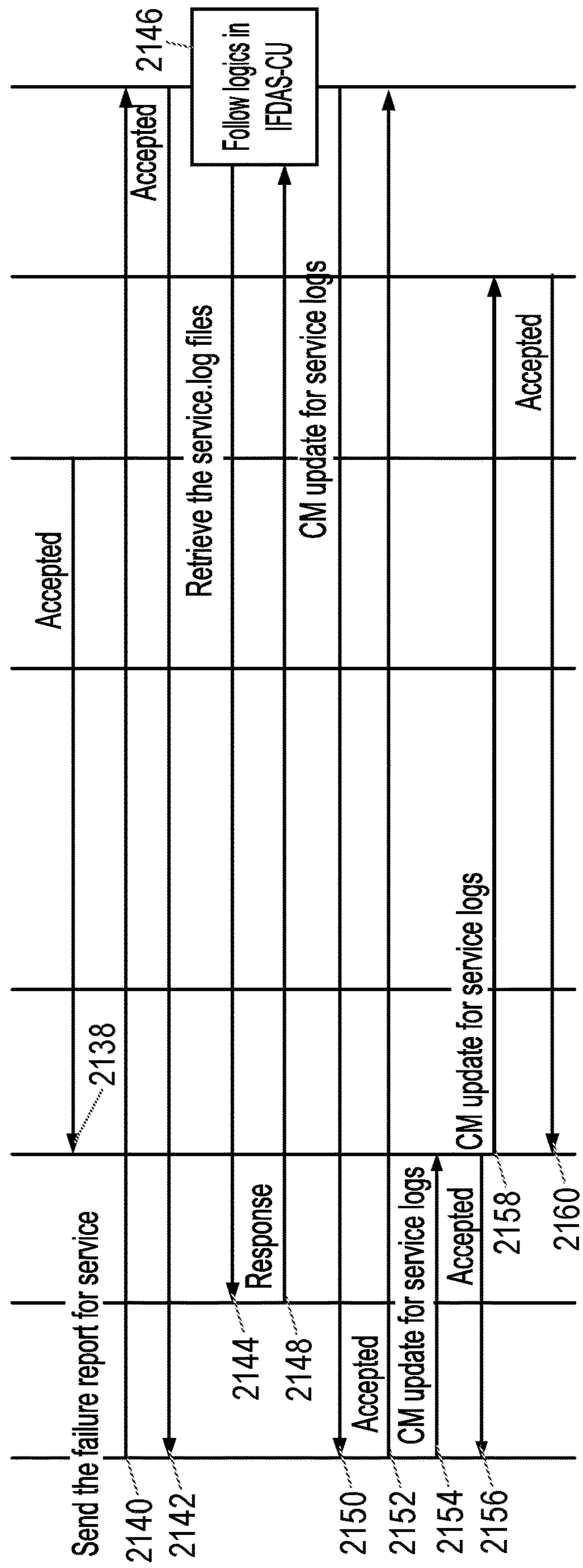

FIG. 24 illustrates an exchange of signals in a system according to an embodiment. More specifically, FIG. 24 illustrates a data flow between a CU 2116 and a DU 2100 for log files. However, it will be understood that other datasets can be used instead of or in addition to log files.

The system illustrated in FIG. 24 comprises the CU 2116 and the DU 2100. The system can also comprise a database (DB) 2102, a DUA 2104, a management system (MS) 2106 for a platform level of a network, an MS 2110 for a virtualization level of the network, an MS 2112 for a container level of the network, and an MS 2114 for an application level of the network. A DC at a first location ("Location X") comprises the DU 2100, the DB 2102, the platform MS 2106, the virtualization MS 2110, the container MS 2112, and the application MS 2114. A node at the DC comprises the DUA 2104. A DC at a central location ("central-office") comprises the CU 2116.

At block 2108 of FIG. 24, each node within the DC logs both access and system performance in the local file system. It may be copied over or streamed into a central storage of the network operator. The log may comprise the feature related information of a given service, which can be dynamically deployed in the DC. For instance, a service $S_4$ can be deployed in the DC located at the first location ("Location X") during a first time interval (e.g. from 9 am to 12 pm) and at a second location ("Location Y") during a second time interval (e.g. from 5 pm to 9 pm).

The procedure from step 2124 to step 2134 in FIG. 24 illustrates a way in which to re-configure CM parameters for logging at node level, virtualization platform level, and container level in order to obtain alternative and/or additional (e.g. more detailed) log information from the network, such as from traffic within the DC. This is realised through the communication between the DU 2100 and the DUA 2104.

In more detail, as illustrated by arrow 2118 of FIG. 24, the DU 2100 transmits a request towards the DB 2102 requesting the retrieval of the log files from the DB 2102. As illustrated by arrow 2120 of FIG. 24, the DB 2102 responds to the request by transmitting the log files towards the DU 2100. As illustrated by block 2122 of FIG. 24, the logic in the DU 2100 is followed to generate updated CM parameters for the logs. As illustrated by arrow 2124 of FIG. 24, the DU 2100 transmits the updated CM parameters for the logs towards the DUA 2104. As illustrated by arrow 2126 of FIG. 24, the DUA 2104 transmits a response towards the DU 2100 indicating that the updated CM parameters for the logs are accepted.

As illustrated by arrow 2128 of FIG. 24, the DUA 2104 transmits a CM update for the platform log towards the platform MS 2106. As illustrated by arrow 2130 of FIG. 24, the platform MS 2106 transmits a response towards the DUA 2104 indicating that the CM update is accepted. As illustrated by arrow 2132 of FIG. 24, the DUA 2104 transmits a CM update for the virtualisation log towards the virtualisation MS 2110. As illustrated by arrow 2134 of FIG. 24, the virtualisation MS 2110 transmits a response towards the DUA 2104 indicating that the CM update is accepted.

The procedure from step 2136 to step 2160 in FIG. 24 illustrates a way in which to re-configure CM parameters for logging at service level to obtain alternative and/or additional (e.g. more detailed) log information from the network, such as from traffic within the DC. This is realised through the communication between the CU 2116, the DU 2100, and the DUA 2104. In more detail, as illustrated by arrow 2136 of FIG. 24, the DUA 2104 transmits a CM update for the container log towards the container MS 2112. As illustrated by arrow 2138 of FIG. 24, the container MS 2112 transmits a response towards the DUA 2104 indicating that the CM update is accepted.

As illustrated by arrow 2140 of FIG. 24, the DU 2100 transmits a failure report for the service towards the CU 2116. As illustrated by arrow 2142 of FIG. 24, the CU 2116 transmits a response towards the DU 2100 indicating that the failure report is accepted. As illustrated by arrow 2144 of FIG. 24 (e.g. by following the logic in the CU at block 2146 of FIG. 24), the CU 2116 transmits a request towards the DB 2102 requesting the retrieval of the service log files from the DB 2102. As illustrated by arrow 2148 of FIG. 24, the DB 2102 responds to the request by transmitting the service log files towards the CU 2116.

As illustrated by arrow 2150 of FIG. 24, the CU 2116 transmits a CM update for the service log towards the DU 2100. As illustrated by arrow 2152 of FIG. 24, the DU 2100 transmits a response towards the CU 2116 indicating that the CM update is accepted. As illustrated by arrow 2154 of FIG. 24, the DU 2100 transmits a CM update for the service log towards the DUA 2104. As illustrated by arrow 2156 of FIG. 24, the DUA 2104 transmits a response towards the DU 2100 indicating that the CM update is accepted. As illustrated by arrow 2158 of FIG. 24, the DUA 2104 transmits the CM update for the service log towards the application MS 2114. As illustrated by arrow 2160 of FIG. 24, the application MS 2114 transmits a response towards the DUA 2104 indicating that the CM update is accepted.

An example of the techniques described herein will now be described in relation to a practical implementation in which an event occurs in a network. For the purpose of this example, the event is a failure but it will be understood that other events are also possible. According to the example, the network comprises a local node and a central node. The local node can be located at the edge of the network, e.g. closer to the end users of the network. The central node can be located in a cloud data center. The local node is responsible for dealing with the failure at a node, virtualization, and container level in the network. There is information associated with the local node that is only accessible by that local node deployed in the network. This information is referred to as local information. The central node is responsible for dealing with the failure at a service level in the network. There is information associated with the network that is accessible by all nodes deployed in the network. This information is referred to as global information.

The process that is implemented at the local node level according to the example will now be described. The process involves analysing one or more attributes of traffic flow in the network using the first machine learning model referred to herein and optionally also the second machine learning model referred to herein. The one or more attributes of traffic flow in this example are referred to herein as one or more first attributes. At flow level, four failure-type classes are defined (e.g. node, virtualization, container and service). The first machine learning model is used to classify the failure that occurs in the network according to these failure-types, such as with a probability distribution. Thus, according to the example, the information about the failure in the network that forms the first output referred to herein is a classification of the failure.

It is identified whether an estimated confidence level for the classification meets the confidence level threshold referred to herein. If the estimated confidence level for the classification meets (i.e. is equal to or greater than) the confidence level threshold, a report is generated on the classification and the report is transmitted towards the central node. On the other hand, if the estimated confidence level for the classification does not meet (i.e. is less than) the confidence level threshold, the second machine learning model is used.

The second machine learning model is used to recommend extra and/or alternative information to be collected from the network to improve the estimated confidence level (e.g. classification accuracy) for the classification output by the first machine learning model. This recommended information in this example is referred to herein as one or more second attributes. The configuration is built in order to retrieve the recommended information from the network. The relevant node(s) deployed in the network are instructed to enable the network to produce the recommended information.

The training of the first machine learning model for the purpose of the example can involve a plurality of data processing steps. A first data processing step may comprise text feature retrieval for log and trace files. A second data processing step may comprise numerical time series feature retrieval for PM counters. A third data processing step may comprise synchronization of the log and trace files with the PM counters to provide the first training dataset for training the first machine learning model. A fourth data processing step may comprise using a semi-supervised machine learning process for labelling the first dataset (failure-type classes). The labelling can be based on the first dataset itself and/or one or more reports (e.g. TRs) from a repository, which relate to past experience. A fifth data processing step may comprise using a supervised machine learning (e.g. auto-encoder or BERT) process to train the first machine learning model.

The training of the second machine learning model for the purpose of the example can also involve a plurality of data processing steps. A first data processing step may comprise building a query based on reports (e.g. TRs) from a repository, which relate to past experience. A second data processing step may comprise using the failure-type as a key feature for the query to create an input for the first machine learning model. A third data processing step may comprise using data augmentation to build a training and validation dataset. A fourth data processing step may comprise using tokenization to convert text into a digital representation. A fifth data processing step may comprise using a supervised machine learning (e.g. auto-encoder or BERT) process to train the second machine learning model.

The process that is implemented at the global node level according to the example will now be described. At the global node level, only service failure is considered. Normally each service has one or more features. In order to find the root cause of a service failure, the process at the global node level can involve identifying which one or more features lead to the service failure, whether the current information is enough to identify the cause of the service failure, and what (e.g. alternative and/or additional) information from the network is to be collected for further analysis of the root cause.

The process at the global node level involves analysing one or more attributes of traffic flow in the network using the first machine learning model referred to herein and optionally also the second machine learning model referred to herein. The one or more attributes of traffic flow are retrieved from (e.g. consolidated) reports, which are received from nodes deployed at different locations in the network. The reports can comprise log and trace information as well as PM counters related to the service. The one or more attributes of traffic flow in this example are referred to herein as one or more first attributes. The first machine learning model is applied to classify which feature causes the service failure. Thus, according to the example, the information about the failure in the network that forms the first output referred to herein is a classification of which feature causes the service failure.

It is identified whether an estimated confidence level for the classification meets the confidence level threshold referred to herein. If the estimated confidence level for the classification does not meet (i.e. is less than) the confidence level threshold, the second machine learning model is used. The second machine learning model is used to recommend extra and/or alternative information to be retrieved from the service to improve the estimated confidence level (e.g. classification accuracy) for the classification output by the first machine learning model. This recommended information in this example is referred to herein as one or more second attributes. The recommended information may be retrieved by setting up a different service log level (e.g. from INFO to DEBUG), setting up a trace for the identified feature, and locating the nodes that are currently providing the service. The configuration is sent to these located nodes. On the other hand, if the estimated confidence level for the classification meets (i.e. is equal to or greater than) the confidence level threshold, a final report is generated on the service failure with the identified features.

The training of the first machine learning model can involve inputting a dataset (e.g. log and trace files) from a test lab of the service provider or real traffic. The dataset comprises traffic patterns within which the relation between service and feature are captured. The input dataset is labelled according to the different features. The dataset can comprise different log and trace files. The dataset can have a mixture of traffic patterns that are related to different implemented features. A supervised machine learning process is used to train the first machine learning model to understand the relationship between the service and feature. A similar process can be used to train the second machine learning model.

There is also provided a computer program comprising instructions which, when executed by processing circuitry (such as the processing circuitry 12 of the first entity 10 described herein and/or the processing circuitry 22 of the second entity 20 described herein), cause the processing circuitry to perform at least part of the method described herein. There is provided a computer program product, embodied on a non-transitory machine-readable medium, comprising instructions which are executable by processing circuitry (such as the processing circuitry 12 of the first entity 10 described herein and/or the processing circuitry 22 of the second entity 20 described herein) to cause the processing circuitry to perform at least part of the method described herein. There is provided a computer program product comprising a carrier containing instructions for causing processing circuitry (such as the processing circuitry 12 of the first entity 10 described herein and/or the processing circuitry 22 of the second entity 20 described herein) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first entity functionality and/or second entity functionality described herein can be performed by hardware. Thus, in some embodiments, the first entity 10 and/or second entity 20 described herein can be a hardware entity. However, it will also be understood that optionally at least part or all of the first entity functionality and/or second entity functionality described herein can be virtualized. For example, the functions performed by the first entity 10 and/or second entity 20 described herein can be implemented in software running on generic hardware that is configured to orchestrate the first entity functionality and/or second entity functionality described herein. Thus, in some embodiments, the first entity 10 and/or second entity 20 described herein can be a virtual entity. In some embodiments, at least part or all of the first entity functionality and/or second entity functionality described herein may be performed in a network enabled cloud. Thus, the method described herein can be realised as a cloud implementation according to some embodiments. The first entity functionality and/or second entity functionality described herein may all be at the same location or at least some of the first entity functionality and/or second entity functionality may be distributed, e.g. the first entity functionality and/or second entity functionality may be performed by one or more different entities.

It will be understood that at least some or all of the method steps described herein can be automated in some embodiments. That is, in some embodiments, at least some or all of the method steps described herein can be performed automatically. The method described herein can be a computer-implemented method.

Therefore, as described herein, there is provided an advantageous technique for analysing one or more network attributes of a network and an advantageous technique for training a machine learning model to analyse one or more network attributes of a network. The techniques described herein can provide a variety of benefits for the network operator. In particular, the techniques described herein can reduce the effort and time required to resolve an event (e.g. fix a failure, such as a SW failure) occurring in the network. This can lead to a significant saving on the cost required for network operation and/or maintenance. The techniques described herein can provide a variety of benefits for the vendors of the network. In particular, the techniques described herein can significantly reduce the effort and time required by support engineers and/or design engineers to resolve an event (e.g. fix a failure, such as a SW failure) occurring in the operator network. The techniques described herein can also be applied during a test phase in the product development, resulting in significant savings. The techniques described herein can provide a variety of benefits for the end users of the network. In particular, the techniques described herein can reduce the service interruption period significantly. This can be especially beneficial in a service oriented architecture (SOA), which may require a high service availability (e.g. of 99.999%).

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by processing circuitry of a first entity for processing one or more network attributes of a network, the method comprising:

processing one or more first network attributes of the network using a first machine learning model to generate a first output comprising information about an event in the network;

if an estimated confidence level for the first output is less than a confidence level threshold, processing the one or more first network attributes using a second machine learning model to generate a second output, the second output being indicative of one or more second network attributes of the network to process using the first machine learning model;

repeating the method for one or more iterations, for each iteration of the one or more iterations, if a second output is generated, the one or more second network attributes from the iteration are processed using the first machine learning model in the subsequent iteration; and initiating a reconfiguration in the network for the one or more second network attributes to be acquired.

2. The method as claimed in claim 1, wherein:

the method is repeated until the confidence level for the first output is equal to or greater than the confidence level threshold.

3. The method as claimed in claim 1, the method comprising:

if the estimated confidence level for the first output is equal to or greater than the confidence level threshold, generating a report on the first output; and if the estimated confidence level for the first output is less than the confidence level threshold, generating a report on the second output.

4. The method as claimed in claim 3, wherein:

the report on the first output comprises information indicative of the one or more first network attributes.

5. The method as claimed in claim 1, wherein:

the one or more first network attributes and the first output are processed using the second machine learning model to generate the second output.

6. The method as claimed in claim 1, wherein:

the information about the event in the network comprises any one or more of:

information indicative of a time of the event in the network;

information indicative of a level within the network at which the event occurs; and information indicative of a cause of the event in the network.

7. The method as claimed in claim 6, wherein:

the level within the network is any one or more of:

a level at which one or more network nodes are deployed in the network;

a level at which one or more computing platforms are deployed in the network;

a level at which virtualization or containerization occurs in the network; and a level at which one or more services are hosted or executed in the network.

8. The method as claimed in claim 6, wherein:

the information about the event in the network comprises, for one or more levels within the network, a percentage value indicative of a likelihood that the event in the network occurs at that level within the network; and the highest percentage value is the information indicative of the level within the network at which the event occurs.

9. The method as claimed in claim 1, wherein:

all of the one or more second network attributes are different from the one or more first network attributes; or the one or more second network attributes comprise at least one of the one or more first network attributes and at least one other network attribute of the network.

10. The method as claimed in claim 1, wherein:

the one or more first network attributes comprise two or more first network attributes that are acquired from different locations in the network; and the one or more second network attributes comprise two or more second network attributes that are acquired from different locations in the network.

11. The method as claimed in claim 1, wherein:

the one or more first network attributes are acquired from any one or more of a log file, a trace file, and a performance management counter; and the one or more second network attributes are acquired from any one or more of a log file, a trace file, and a performance management counter.

12. The method as claimed in claim 1, wherein:

the one or more first network attributes comprise at least two first network attributes and the at least two first network attributes are in a time series; and the one or more second network attributes comprise at least two second network attributes and the at least two second network attributes are in a time series.

13. The method as claimed in claim 1, wherein:

the one or more first network attributes comprise at least two first network attributes and each of the at least two first network attributes have the same time stamp; and the one or more second network attributes comprise at least two second network attributes and each of the at least two second network attributes have the same time stamp.

14. The method as claimed in claim 1, wherein:

the one or more first network attributes comprise at least two first network attributes that are in different formats;

the method comprises converting the at least two first network attributes into the same format;

the one or more second network attributes comprise at least two second network attributes that are in different formats; and the method comprises converting the at least two second network attributes into the same format.

15. The method as claimed in claim 1, wherein:

processing the one or more first network attributes using the second machine learning model to generate the second output comprises:

using the second machine learning model to:

compare the one or more first network attributes to one or more second outputs previously generated using the second machine learning model, wherein each previously generated second output is indicative of one or more second network attributes of the network previously processed using the first machine learning model; and generate the second output based on a result of the comparison.

16. A computer-implemented method performed by processing circuitry of a second entity for processing for training a machine learning model to process one or more network attributes of a network, the method comprising:

training a first machine learning model to process one or more first network attributes of the network to generate a first output comprising information about an event in the network;

training a second machine learning model to process the one or more first network attributes to generate a second output if an estimated confidence level for the first output is less than a confidence level threshold, the second output being indicative of one or more second network attributes of the network to process using the first machine learning model, if a second output is generated, the one or more second network attributes from an iteration are processed using the first machine learning model in a subsequent iteration; and initiating a reconfiguration in the network for the one or more second network attributes to be acquired.

17. The method as claimed in claim 16, wherein:

the first machine learning model is trained using a first training dataset, wherein the first training dataset comprises information indicative of a past occurrence of the event in the network and one or more first network attributes of the network corresponding to the past occurrence of the event; and the second machine learning model is trained using a second training dataset, wherein the second training dataset comprises the one or more first network attributes of the network corresponding to the past occurrence of the event and one or more second network attributes of the network corresponding to the past occurrence of the event.

18. The method as claimed in claim 17, wherein:

the information indicative of the past occurrence of the event has a time stamp indicative of a time of the past occurrence of the event;

each first network attribute of the one or more first network attributes has a time stamp indicative of a time at which the first network attribute was recorded; and for each first network attribute of the one or more first network attributes, the time at which the first network attribute was recorded is a time that falls within a predefined time interval that precedes the time of the past occurrence of the event.

19. A computer program comprising instructions stored in a non-transitory medium which, when executed by processing circuitry, cause the processing circuitry to perform a method according to for processing one or more network attributes of a network, the method comprising:

processing one or more first network attributes of the network using a first machine learning model to generate a first output comprising information about an event in the network;

if an estimated confidence level for the first output is less than a confidence level threshold, processing the one or more first network attributes using a second machine learning model to generate a second output, the second output being indicative of one or more second network attributes of the network to process using the first machine learning model;

repeating the method for one or more iterations, for each iteration of the one or more iterations, if a second output is generated, the one or more second network attributes from the iteration are processed using the first machine learning model in the subsequent iteration; and initiating a reconfiguration in the network for the one or more second network attributes to be acquired.

* * * * *